United States Patent
Hedlund et al.

(10) Patent No.: US 11,134,321 B2
(45) Date of Patent: Sep. 28, 2021

(54) WIRELESS TEMPERATURE PROBE

(71) Applicant: The Vollrath Company, L.L.C., Sheboygan, WI (US)

(72) Inventors: Brian Hedlund, Kohler, WI (US); Jill Hundley, Sheboygan, WI (US); Rebecca J. Schreiber-Pethan, Sheboygan, WI (US); Peter Roever, West Bend, WI (US); Jeremiah Kopiness, Saukville, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 7 days.

(21) Appl. No.: 16/556,488

(22) Filed: Aug. 30, 2019

(65) Prior Publication Data
US 2019/0387290 A1    Dec. 19, 2019

Related U.S. Application Data

(63) Continuation-in-part of application No. 15/668,195, filed on Aug. 3, 2017, now Pat. No. 10,598,549.
(Continued)

(51) Int. Cl.
*G01J 5/00*    (2006.01)
*H04Q 9/02*    (2006.01)
(Continued)

(52) U.S. Cl.
CPC .............. *H04Q 9/02* (2013.01); *H04W 4/38* (2018.02); *A47J 36/2483* (2013.01); *G05B 15/02* (2013.01);
(Continued)

(58) Field of Classification Search
CPC .. G01N 21/359; H05B 6/6455; H05B 3/0076; H05B 6/6452; H05B 1/0258; G01J 5/025;
(Continued)

(56) References Cited

U.S. PATENT DOCUMENTS 2,688,876 A * 9/1954 Barnes .................... G01K 1/14
374/141
3,504,544 A * 4/1970 Tymkewicz ........... G01K 1/146
374/155
(Continued)

FOREIGN PATENT DOCUMENTS

CN    202141092 U    2/2012
CN    108852057 A  * 11/2018
(Continued)

OTHER PUBLICATIONS

Search Report for International Application No. PCT/US2017/045286, dated Oct. 13, 2017, 9 pages.
(Continued)

*Primary Examiner* — Gail Kaplan Verbitsky
(74) *Attorney, Agent, or Firm* — Foley & Lardner LLP

(57) ABSTRACT

A probe used with food preparation, rethermalization, storage, transportation, and/or service includes a head portion with a display, and a shaft portion that is coupled to the head portion and is configured to be at least partially immersed in a foodstuff. The probe further includes a sensing unit configured to collect data including the temperature of the foodstuff and a wireless device configured to transmit data collected by the sensing unit to a supervisory control device.

20 Claims, 18 Drawing Sheets

Related U.S. Application Data

(60) Provisional application No. 62/371,156, filed on Aug. 4, 2016.

(51) Int. Cl.
*H04W 4/38* (2018.01)
*H04W 84/18* (2009.01)
*G07F 17/00* (2006.01)
*G05B 15/02* (2006.01)
*A47J 36/24* (2006.01)

(52) U.S. Cl.
CPC ..... *G07F 17/0085* (2013.01); *H04Q 2209/40* (2013.01); *H04Q 2209/84* (2013.01); *H04W 84/18* (2013.01)

(58) Field of Classification Search
CPC ...... G01J 5/0265; G01J 3/0272; G01J 5/0846; G01K 13/00; G01K 2207/06; H04Q 9/02; H04Q 2209/40; H04W 84/18; H04W 4/38; G07F 17/0085; G08C 2201/93; G08C 23/04; H04L 67/12
USPC .................................. 340/870.17
See application file for complete search history.

(56) References Cited

U.S. PATENT DOCUMENTS

| | | | |
|---|---|---|---|
| 3,742,178 A | 6/1973 | Harnden, Jr. | |
| 4,230,731 A | 10/1980 | Tyler | |
| 4,340,796 A | 7/1982 | Yamaguchi et al. | |
| 4,377,733 A | 3/1983 | Yamaguchi et al. | |
| 4,399,824 A | 8/1983 | Davidson | |
| 4,475,024 A | 10/1984 | Tateda | |
| 4,518,839 A | 5/1985 | Taguchi et al. | |
| 4,587,406 A | 5/1986 | Andre | |
| 4,626,662 A | 12/1986 | Woolf | |
| 4,973,170 A * | 11/1990 | Bescherer | G01K 1/14 374/109 |
| 5,152,610 A * | 10/1992 | Hallett | E04H 4/14 374/141 |
| 5,373,608 A | 12/1994 | Welch | |
| 5,575,563 A | 11/1996 | Chiu et al. | |
| 5,620,255 A * | 4/1997 | Cook, III | A47J 43/28 374/141 |
| 5,746,114 A | 5/1998 | Harris | |
| 5,934,171 A | 8/1999 | Thompson | |
| 5,934,181 A | 8/1999 | Adamczewski | |
| 5,951,900 A | 9/1999 | Smrke | |
| 5,983,783 A | 11/1999 | Archard et al. | |
| D422,224 S | 4/2000 | Yu | |
| D424,954 S | 5/2000 | Chambers | |
| D427,025 S | 6/2000 | Lee | |
| 6,080,972 A | 6/2000 | May | |
| D439,809 S | 4/2001 | Ming et al. | |
| D441,669 S | 5/2001 | Lam | |
| D445,654 S | 7/2001 | Yu | |
| D456,285 S | 4/2002 | Lee | |
| D456,286 S | 4/2002 | Yu | |
| 6,539,842 B1 | 4/2003 | Chapman et al. | |
| D477,505 S | 7/2003 | Devlin et al. | |
| D479,476 S | 9/2003 | Devlin et al. | |
| D479,807 S | 9/2003 | Norcross et al. | |
| D479,958 S | 9/2003 | Hsu | |
| 6,698,923 B2 | 3/2004 | Bedetti et al. | |
| 6,845,735 B1 * | 1/2005 | Northrop | A01K 5/0225 119/52.1 |
| 6,850,861 B1 | 2/2005 | Faiola et al. | |
| 6,854,883 B2 * | 2/2005 | Rund | G01K 15/00 116/216 |
| 6,860,192 B2 * | 3/2005 | Sharpe | A47J 37/10 374/141 |
| 6,953,919 B2 | 10/2005 | Clothier | |
| 7,075,442 B2 | 7/2006 | Lion | |
| 7,080,593 B1 | 7/2006 | Frankel | |
| 7,091,638 B2 * | 8/2006 | Bevington | H02K 5/132 310/67 R |
| 7,165,489 B1 | 1/2007 | Fernandez et al. | |
| D549,057 S | 8/2007 | Sanoner | |
| D555,436 S | 11/2007 | Slothower | |
| 7,322,278 B2 | 1/2008 | Mercer et al. | |
| 7,337,712 B1 | 3/2008 | Wang et al. | |
| 7,381,933 B2 | 6/2008 | Cristiani | |
| 7,409,765 B2 | 8/2008 | So | |
| 7,473,872 B2 | 1/2009 | Takimoto | |
| 7,520,668 B2 * | 4/2009 | Chen | G01J 5/02 374/121 |
| 7,605,349 B2 | 10/2009 | Gaynor et al. | |
| 7,964,824 B2 | 6/2011 | Moon | |
| RE42,513 E | 7/2011 | Clothier | |
| 8,188,409 B2 | 5/2012 | Baier | |
| 8,240,914 B1 * | 8/2012 | Chapman | G01K 1/024 374/155 |
| 8,274,392 B2 | 9/2012 | Goltenboth | |
| 8,353,423 B2 | 1/2013 | McIntyre et al. | |
| 8,398,303 B2 | 3/2013 | Kuhn | |
| 8,556,502 B2 | 10/2013 | Austen et al. | |
| 8,598,497 B2 | 12/2013 | Broders et al. | |
| D698,211 S | 1/2014 | Biever | |
| 8,754,351 B2 | 6/2014 | England et al. | |
| 8,783,947 B2 | 7/2014 | Elenbaas et al. | |
| 8,979,363 B2 * | 3/2015 | Groeneweg | B61L 23/042 374/141 |
| 9,006,622 B2 | 4/2015 | Beverly et al. | |
| 9,060,212 B2 | 6/2015 | Loic | |
| 9,131,537 B2 | 9/2015 | Broders et al. | |
| 9,191,998 B2 | 11/2015 | Hegedis et al. | |
| 9,215,758 B2 | 12/2015 | Imura | |
| 9,341,518 B2 * | 5/2016 | Batti | G01F 23/22 |
| 9,439,530 B2 | 9/2016 | Logan et al. | |
| 9,477,962 B2 | 10/2016 | Worrall et al. | |
| 9,648,975 B2 | 5/2017 | Imura | |
| 10,088,371 B2 | 10/2018 | Kaiser et al. | |
| 10,444,080 B2 * | 10/2019 | Brown | A47J 36/321 |
| 10,973,368 B2 * | 4/2021 | Wang | A47J 39/02 |
| 2002/0009121 A1 | 1/2002 | Siu | |
| 2002/0124737 A1 * | 9/2002 | Bedetti | A47J 43/28 99/342 |
| 2002/0150144 A1 * | 10/2002 | Chapman | A23G 3/04 374/189 |
| 2002/0181542 A1 | 12/2002 | Lee | |
| 2003/0007544 A1 * | 1/2003 | Chang | G01K 1/026 374/100 |
| 2004/0016348 A1 | 1/2004 | Sharpe | |
| 2004/0247015 A1 * | 12/2004 | Wojan | G01K 1/14 374/120 |
| 2005/0011367 A1 | 1/2005 | Crow | |
| 2005/0242086 A1 | 11/2005 | Imura | |
| 2006/0086258 A1 | 4/2006 | Sharpe | |
| 2006/0185523 A1 | 8/2006 | Wiedemann et al. | |
| 2007/0095215 A1 | 5/2007 | Ho | |
| 2008/0041233 A1 * | 2/2008 | Bunn | A47J 31/007 99/281 |
| 2009/0096617 A1 | 4/2009 | Purcell et al. | |
| 2009/0188396 A1 * | 7/2009 | Hofmann | G01K 1/024 99/342 |
| 2011/0044370 A1 | 2/2011 | Schochet et al. | |
| 2012/0000903 A1 | 1/2012 | Baarman et al. | |
| 2013/0061763 A1 * | 3/2013 | Piai | A47J 31/56 99/295 |
| 2013/0305933 A1 | 11/2013 | Heidrich et al. | |
| 2014/0098835 A1 | 4/2014 | Herzog et al. | |
| 2014/0292536 A1 | 10/2014 | Barth et al. | |
| 2014/0348987 A1 | 11/2014 | Cheng et al. | |
| 2015/0008216 A1 | 1/2015 | Pippia | |
| 2015/0037471 A1 | 2/2015 | Fung et al. | |
| 2015/0064314 A1 | 3/2015 | Manuel et al. | |
| 2015/0114962 A1 | 4/2015 | Kaiser et al. | |
| 2015/0149120 A1 | 5/2015 | Burkhardt et al. | |
| 2015/0208845 A1 | 7/2015 | Robbins et al. | |
| 2015/0208858 A1 | 7/2015 | Robbins et al. | |
| 2015/0233573 A1 | 8/2015 | Ke | |

(56) References Cited

U.S. PATENT DOCUMENTS

| | | |
|---|---|---|
| 2015/0282661 A1 | 10/2015 | Wu |
| 2015/0300887 A1 | 10/2015 | Mandava et al. |
| 2015/0312964 A1 | 10/2015 | Sorenson et al. |
| 2015/0341579 A1 | 11/2015 | Kobayashi et al. |
| 2015/0342388 A1 | 12/2015 | Wu |
| 2015/0342389 A1 | 12/2015 | Wu |
| 2015/0342390 A1 | 12/2015 | Wu |
| 2015/0342392 A1 | 12/2015 | Wu |
| 2015/0374161 A1 | 12/2015 | Bilet et al. |
| 2016/0000138 A1* | 1/2016 | van Leeuwen ......... A23P 20/17 426/302 |
| 2016/0037956 A1 | 2/2016 | Wu |
| 2016/0051078 A1 | 2/2016 | Jenkins et al. |
| 2016/0067649 A1 | 3/2016 | Sevier |
| 2016/0088685 A1 | 3/2016 | Henke et al. |
| 2016/0109301 A1 | 4/2016 | Thompson et al. |
| 2016/0377490 A1 | 12/2016 | Nivala et al. |
| 2016/0377492 A1 | 12/2016 | Lee et al. |
| 2017/0013681 A1 | 1/2017 | Lee et al. |
| 2017/0099990 A1 | 4/2017 | Magnouloux et al. |
| 2017/0099995 A1 | 4/2017 | Magnouloux |
| 2017/0138797 A1 | 5/2017 | Brown et al. |
| 2017/0150841 A1* | 6/2017 | Johncock ............... A47J 43/283 |
| 2017/0219215 A1* | 8/2017 | Hui ........................ F24C 7/083 |
| 2017/0244820 A1 | 8/2017 | Schriefer |
| 2017/0244828 A1 | 8/2017 | Chan et al. |
| 2018/0116457 A1 | 5/2018 | Mills et al. |
| 2018/0120169 A1* | 5/2018 | Jackson ............... H04L 63/0428 |
| 2018/0338636 A1* | 11/2018 | Ceccoli .................... F24C 15/10 |
| 2019/0101112 A1* | 4/2019 | Scalf ........................ G01C 9/00 |
| 2019/0172323 A1 | 6/2019 | Deng |
| 2019/0231113 A1* | 8/2019 | Young .................. G05B 19/042 |
| 2019/0313603 A1* | 10/2019 | Snell .................... A01K 1/0209 |
| 2020/0046146 A1* | 2/2020 | Hansen .................. A47F 3/007 |
| 2020/0110058 A1* | 4/2020 | Bai ...................... G01N 29/2418 |
| 2021/0084945 A1* | 3/2021 | Gillette .................. A22C 9/001 |
| 2021/0094735 A1* | 4/2021 | Bentkovski .......... B65D 51/248 |

FOREIGN PATENT DOCUMENTS

| | | | |
|---|---|---|---|
| DE | 20203566 U1 | 5/2002 | |
| JP | 56147025 A | * 11/1981 | ............ G01K 1/024 |
| JP | 2001-221791 A | 8/2001 | |
| JP | 3370305 B2 | 1/2003 | |
| KR | 20080012157 A | 2/2008 | |
| KR | 2015012000 A | 2/2015 | |
| WO | WO-2016/138555 A1 | 9/2016 | |

OTHER PUBLICATIONS

Wireless Food Temperature Probes Product Sheet, https://www.bapihvac.com/product/wireless-food-temperature-probes/?combo=#configure, retrieved May 24, 2017, 3 pages.

* cited by examiner

SECTION A-A-A

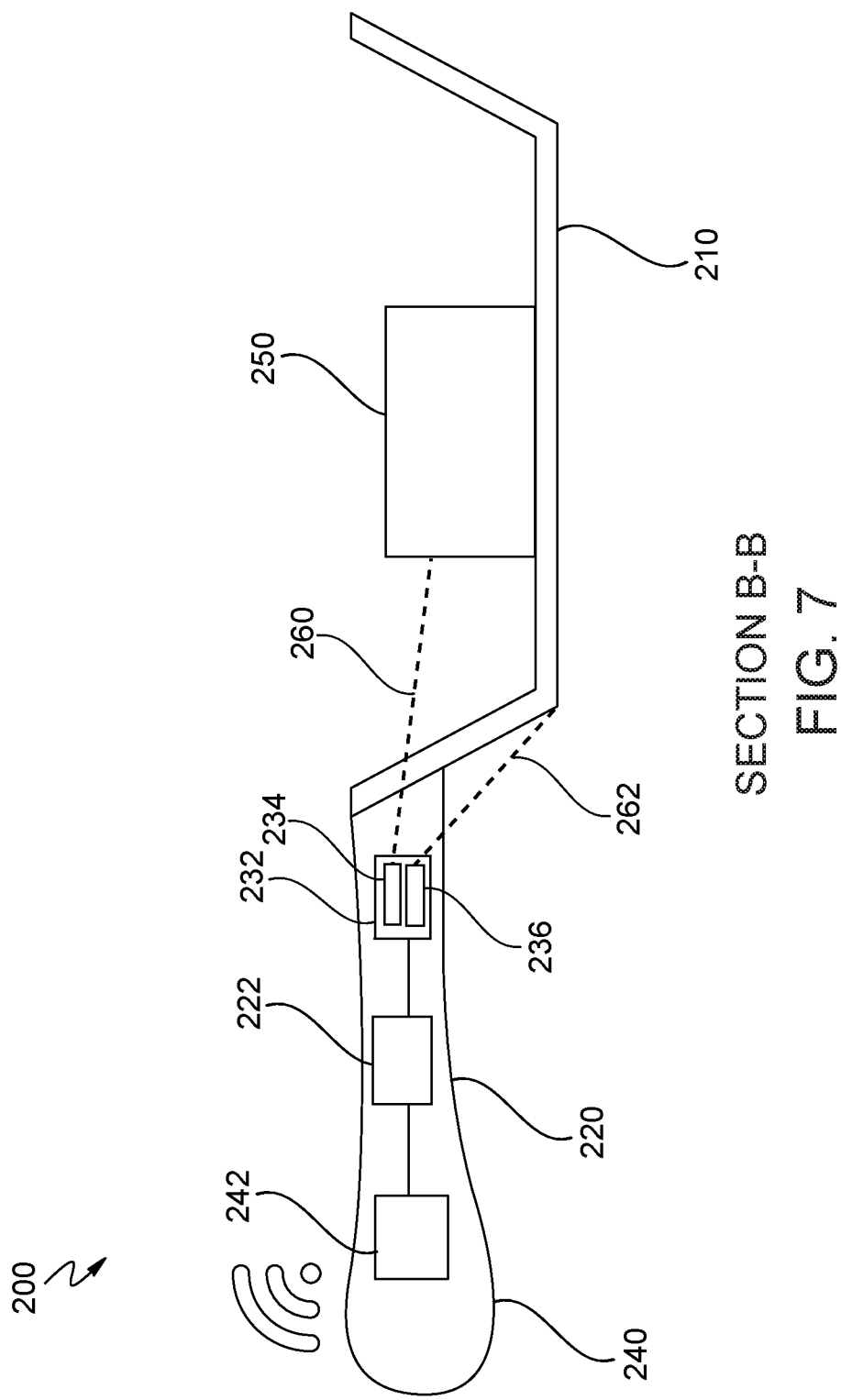

us 11,134,321 B2

WIRELESS TEMPERATURE PROBE

CROSS-REFERENCE TO RELATED PATENT APPLICATIONS

This application is a continuation-in-part of U.S. patent application Ser. No. 15/668,195 filed Aug. 3, 2017, which claims the benefit of and priority to U.S. Patent Application No. 62/371,156 filed Aug. 4, 2016. The entire disclosure of each application is incorporated by reference herein.

BACKGROUND

The present disclosure relates generally to the field of food service equipment. More specifically, the present disclosure relates to an immersible probe configured to communicate wirelessly with food equipment to monitor and control a process related to the preparation, storage, or service of food.

SUMMARY

One embodiment of the invention relates to a probe used with food preparation, rethermalization, storage, transportation, and/or service. The probe includes a head portion with a display, and a shaft portion that is coupled to the head portion and is configured to be at least partially immersed in a foodstuff. The probe further includes a sensing unit configured to collect data including the temperature of the foodstuff and a wireless device configured to transmit data collected by the sensing unit to a supervisory control device.

Another embodiment of the invention relates to probe used with food preparation, rethermalization, storage, transportation, and/or service. The probe includes a hub and multiple arms extending from the hub. The probe further includes multiple sensing units configured to collect data including the temperature of the foodstuff, a wireless device configured to transmit data collected by the sensing units to a supervisory control device, a shaft portion coupled to the hub, and a suction cup coupled to the shaft portion and configured to detachably couple the probe to a food pan containing the foodstuff.

Yet another embodiment of the invention relates to a system used with food preparation, rethermalization, storage, transportation, and/or service. The system includes a food pan configured to contain a foodstuff, a probe, and a supervisory control device. The probe includes a probe body configured to couple to an edge of the food pan, and a sensing unit configured to collect data including the temperature of the foodstuff. The sensing unit includes a rectangular-shaped lens configured to focus infrared energy emitted from the foodstuff onto a plurality of photodetectors. The probe further includes a wireless device configured to transmit data collected by the sensing unit. The supervisory control device is configured to receive transmissions from the wireless device and to display the data collected by the sensing unit on a dashboard user interface.

Yet another embodiment of the invention relates to a system used with food preparation, rethermalization, storage, transportation, and/or service. The system includes a food pan configured to contain a foodstuff and an electronics unit. The electronics unit is inseparably coupled with the food pan and includes a sensing unit configured to collect data including the temperature of the foodstuff and a wireless device configured to transmit data collected by the sensing unit.

BRIEF DESCRIPTION OF THE DRAWINGS

The invention will become more fully understood from the following detailed description, taken in conjunction with the accompanying drawings, in which:

FIG. 7 is a sectional view of the cooking appliance of FIG. 6, according to an exemplary embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
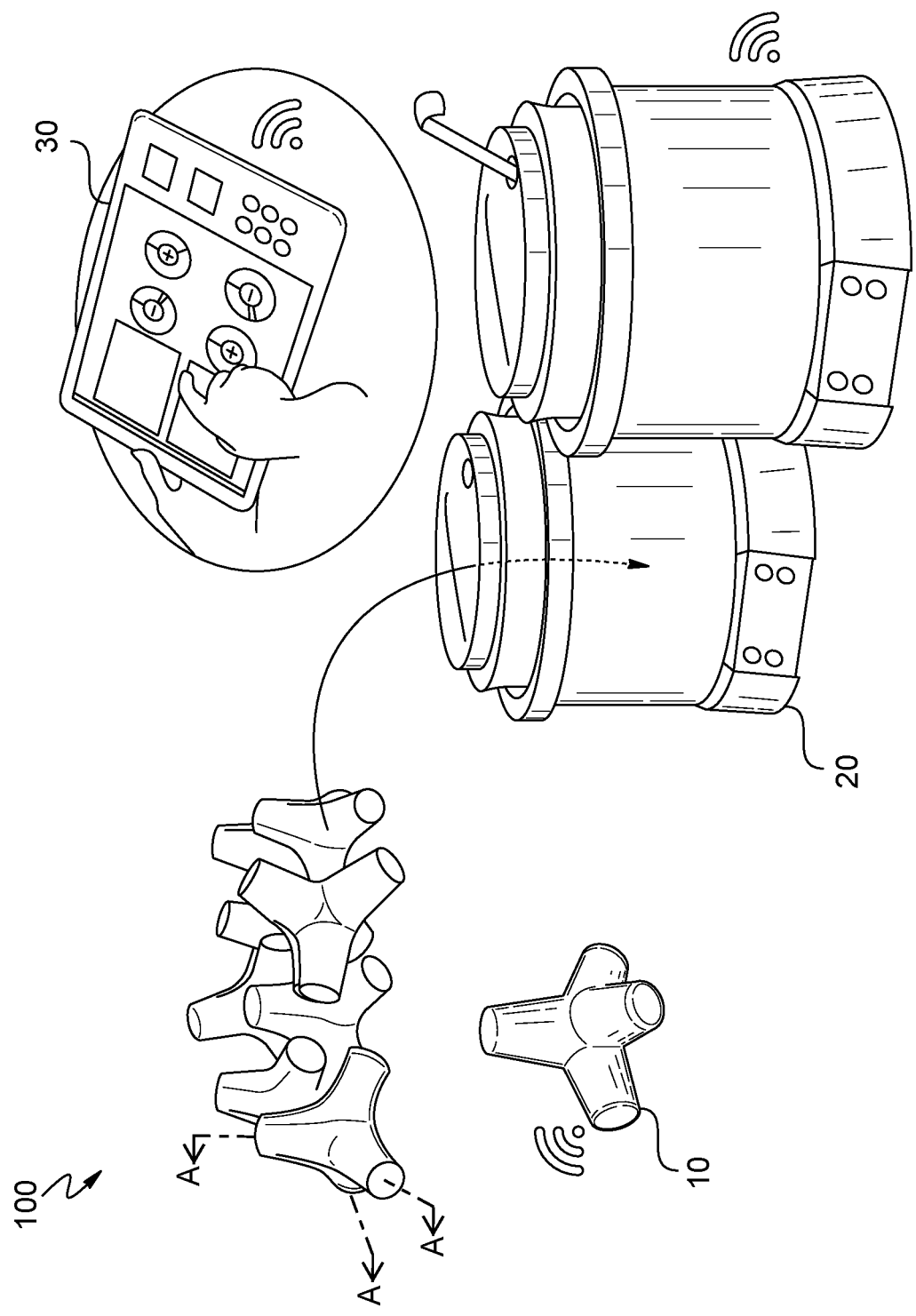
FIG. 1 is a perspective view of a wireless probe food preparation system, according to an exemplary embodiment.

Referring to FIG. 1, a wireless probe food preparation system 100 is shown according to an exemplary embodiment. Food preparation system 100 includes, but is not limited to, a wireless probe 10, food equipment 20, and a wireless control device 30. In addition to food preparation, system 100 may be used for any process related to food, including rethermalization, storage, transportation, service, or other activities involving the heating, monitoring, or control of the food where data or other inputs would be helpful.

Figure 2:
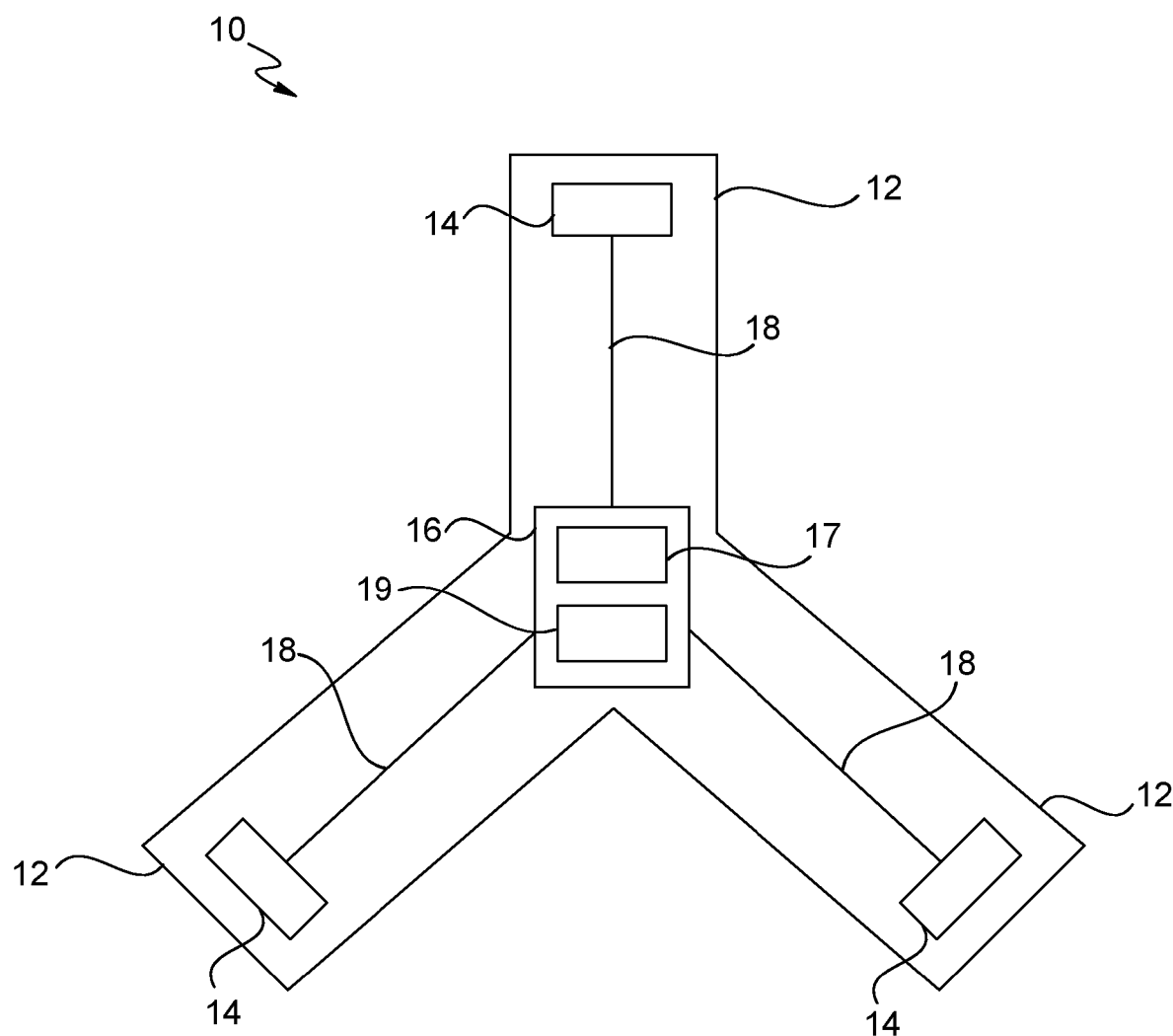
FIG. 2 is an offset sectional view of a wireless probe used in the wireless probe food preparation system of FIG. 1, according to an exemplary embodiment.

Referring now to FIG. 2, according to an exemplary embodiment, wireless probe 10 measures the temperature of a foodstuff while the probe is immersed in the foodstuff. To accomplish this measurement, wireless probe 10 contains at least one sensor 14 within the body of the probe configured to measure temperature. Wireless probe 10 may have any desired geometry, so long as the geometry houses the desired number of sensors 14. In an exemplary embodiment, the probe is shaped so as to not resemble a foodstuff. For example, as shown in FIGS. 1-2, probe 10 contains a plurality of arms (shown as four cylindrically-shaped arms 12) extending from a central point or hub. In some embodiments, each of the four arms 12 contains a sensor 14. Wireless probe 10 may additionally be any desired size, so long as the size prevents accidental ingestion. For example, wireless probe 10 may be around the size of a tennis ball.

In an exemplary embodiment, the measurements of the sensors 14 may be combined via any suitable statistical method to result in a mean temperature reading of the foodstuff. In addition, sensors 14 may be configured to measure other properties in addition to, or besides temperature. For example, these properties may include, but are not limited to, the amount of time elapsed in a food preparation process, the weight of a foodstuff, the viscosity of a foodstuff, a humidity level, or a level of foodstuff contained in food equipment 20 (e.g., so that a user handling the foodstuff knows when refilling is necessary). Sensors 14 may be further configured to detect the presence of a gas (e.g., oxygen, ethylene, or any other gas detrimental to the preservation of food) and the location of the probe (to assist in pairing a probe 10 with food equipment 20 using a wireless device, see below).

In some embodiments, wireless probe 10 further contains an electronics unit 16. Electronics unit 16 is shown to include, among other components, a memory device 17 and a wireless transmitter device 19. Memory device 17 may be one or more devices (e.g., RAM, ROM, Flash memory, hard disk storage) for storing data received from sensors 14 and/or computer code for completing and/or facilitating various processes. Data may be received from sensors 14 via any suitable wired or wireless means, as indicated by reference 18. Memory device 17 may be or include non-transient volatile memory, non-volatile memory, and non-transitory computer storage media. Memory device 17 may also include database components, object code components, script components, or any other type of information structure for supporting the various activities and information structures described herein. In some embodiments, memory device 17 is communicably coupled to a processor and includes computer code or instructions for executing a process.

Still referring to FIG. 2, wireless transmitter device 19 is configured to transmit data collected by the sensors 14 to food equipment 20 and wireless control device 30. In an exemplary embodiment, the wireless transmitter device 19 is configured to transmit data using Bluetooth protocols. In other embodiments, wireless transmitter device 19 is configured to transmit data using a different wireless protocol, including RFID, or near field communication. In one embodiment, the wireless transmitter device 19 may be an RFID chip or other device configured to permit the probe to be paired with a particular piece or component of food equipment 20, or a portion of a food equipment (e.g., one steam table within a multi-well steam table unit). For example, when the wireless transmitter device 19 and equipment 20 are paired and the probe 10 is moved within a certain distance of the equipment 20, the equipment 20 may be configured to initiate or modify a heating process.

The sensors 14, memory device 17, and wireless transmitter device 19 of wireless probe 10 may be powered through various means. In an exemplary embodiment, probe 10 contains a non-rechargeable battery housed in electronics unit 16, which may be accessed and replaced through a battery compartment. In other embodiments, electronics unit 16 contains a rechargeable battery (e.g., a lithium-ion battery). In these embodiments, the rechargeable battery may be recharged through the use of a plug-in power cord, or through the use of a wireless charging mat, a contact button, or another wireless charging device.

Wireless probe 10 is configured to communicate wirelessly with food equipment 20. As shown in FIG. 1, food equipment 20 is depicted as a rethermalizing kettle for serving soup. In this embodiment, the probe 10 may transmit temperature or time data to the kettle 20 in order to maintain the soup at a desired temperature, or to turn the kettle 20 off once a certain heating period has elapsed. However, in various embodiments and as further described below, food equipment 20 may be any device or apparatus configured to assist in the preparation, rethermalization, storage, transportation, and service of food. For example, food equipment 20 includes, but is not limited to, a soup kettle, an induction cooker, an induction range, a steam table or tray, a chafing dish, or a food storage container.

Again referring to FIG. 1, system 100 is further shown to include a wireless control device 30. Wireless control device 30 may be configured to receive sensor data transmitted via wireless transmitter device 19 from wireless probe 10 in order to monitor or control a preparation and/or cooking process. For example, after receiving a temperature measurement from probe 10, a user may issue a command from wireless control device 30 to food equipment 20 to modify a temperature setpoint or programmed cook time. The wireless control device may be incorporated in the food service equipment. In an exemplary embodiment, wireless control device 30 is a mobile device (e.g., a smartphone, a tablet). In other embodiments, wireless control device 30 is a unit specifically configured to control a particular type of food equipment 20, or a website configured to act as a gateway to a remote data storage facility (i.e., a cloud service). As the wireless control device 30 receives data from the probe 10, it may make adjustments to the heating of the foodstuffs (e.g., increasing heat input if the temperature detected by the sensors fall below a set-level; decreasing heat input if the temperature detected by the sensors raises above a set level), providing a report or alarm (e.g., at certain temperature levels or elapsed time), or other adjustments related to the food.

In some embodiments, probe 10 continuously transmits data to wireless control device 30. When the data exceeds a certain threshold (e.g., when the measured temperature exceeds a certain value) or satisfies a certain condition (e.g., when the presence of a gas is detected) as defined by the programming of the wireless control device 30, control device 30 may complete an action in response. In other embodiments, probe 10 stores data in memory device 17 until the data exceeds a certain threshold or satisfies a certain condition stored in memory device 17. Once the threshold is exceeded or satisfied, probe 10 transmits the data to wireless control device 30 and control device 30 may complete an action in response. In various embodiments, the action completed in response by wireless control device 30 may include transmitting a control signal to modify an operating condition of food equipment 20 (e.g., increasing or decreasing the cook temperature of food equipment) or displaying an alert to a user.

Figure 4:
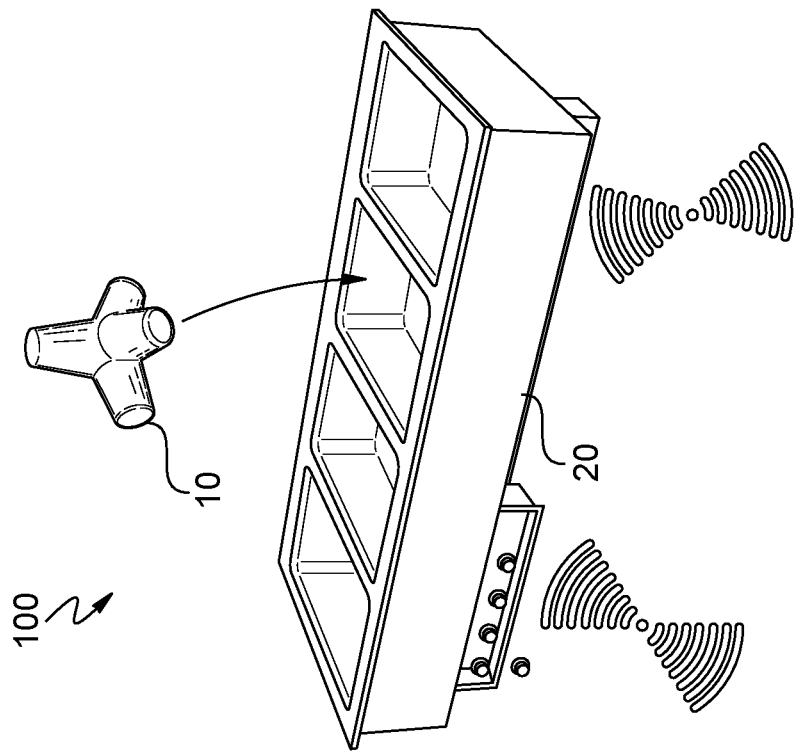
FIGS. 3-4 are perspective views of the wireless probe food preparation system of FIG. 1 including a steam table apparatus, according to exemplary embodiments.
Figure 3:
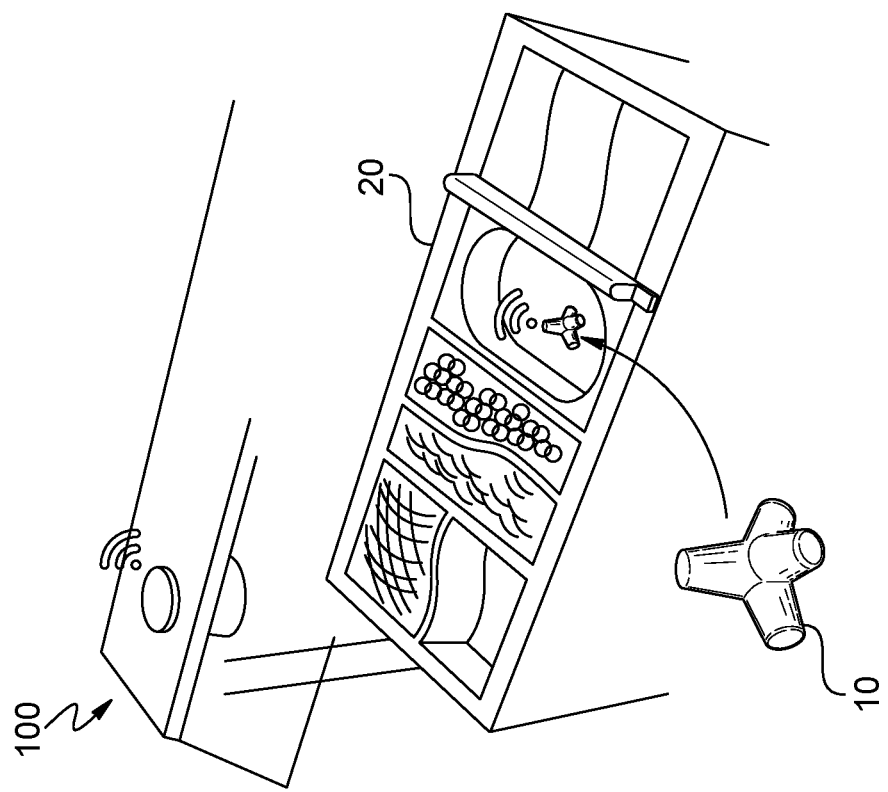

Referring now to FIGS. 3-4, views of system 100 including steaming tables are depicted, according to alternate exemplary embodiments. As described above, wireless probe 10 may include a wireless transmitter device 19 configured to be paired with tray openings contained in steaming tables 20. For example, when a tray containing foodstuff with an immersed wireless probe 10 is placed in one of the tray openings of steam table 20, wireless transmitter 19 (e.g., an RFID transmitter device) may communicate with a wireless receiver device (e.g., an RFID receiver device) located in the tray opening to initiate a heating process localized to the particular tray opening. In other embodiments, probe 10 may transmit temperature data to wireless control device 30, and control device 30 may transmit heating commands to steaming table 20.

Figure 5:
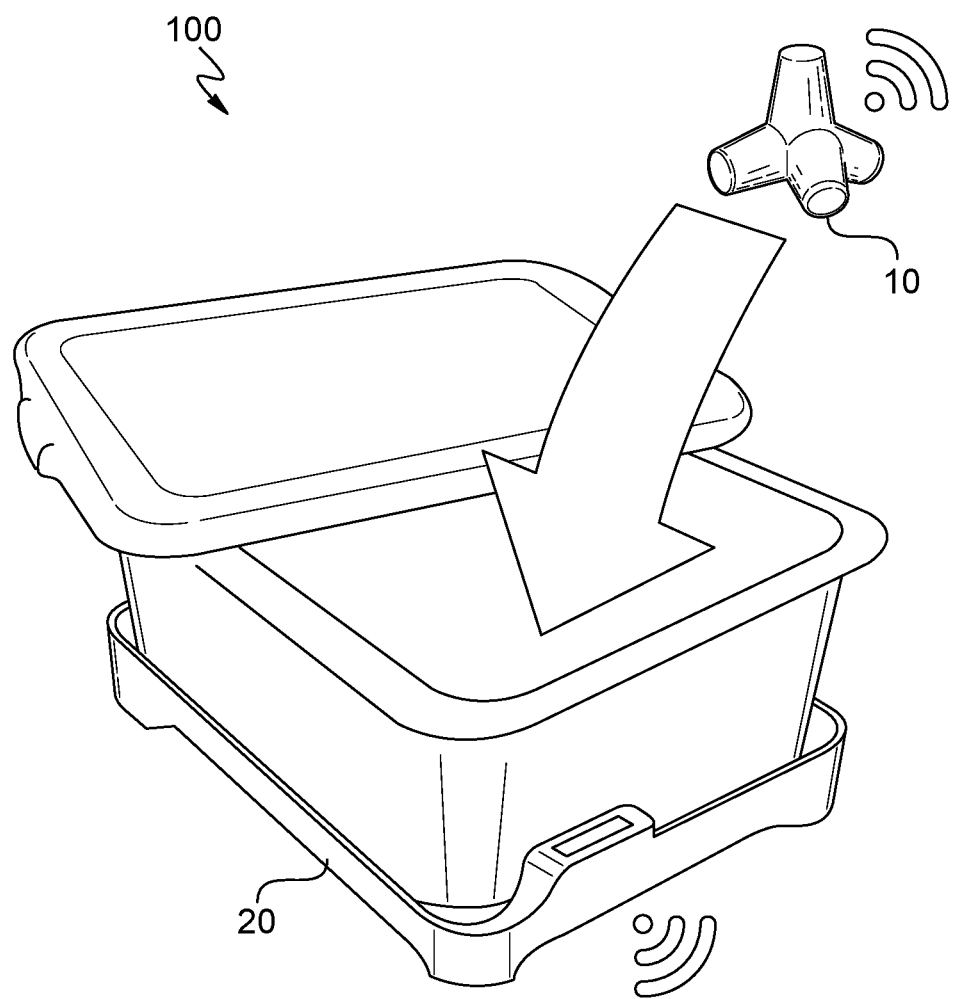
FIG. 5 is a perspective view of the wireless probe food preparation system of FIG. 1 including a food storage container, according to an exemplary embodiment.

Turning now to FIG. 5, a view of system 100 including food equipment 20 in the form of a food storage container is depicted, according to an alternate exemplary embodiment. As described above, food equipment 20 may include any apparatus or device related to a process involving food, including a food storage container. In an exemplary embodiment, wireless probe 10 is placed with the foodstuff within the food storage container 20. In some embodiments, the food storage container may be color coded according to hazard analysis critical control point (HACCP) colors (e.g., red for raw meat, green for produce, etc.) and wireless probe 10 may be configured to store and transmit data used to ensure compliance with HACCP protocols.

Figure 6:
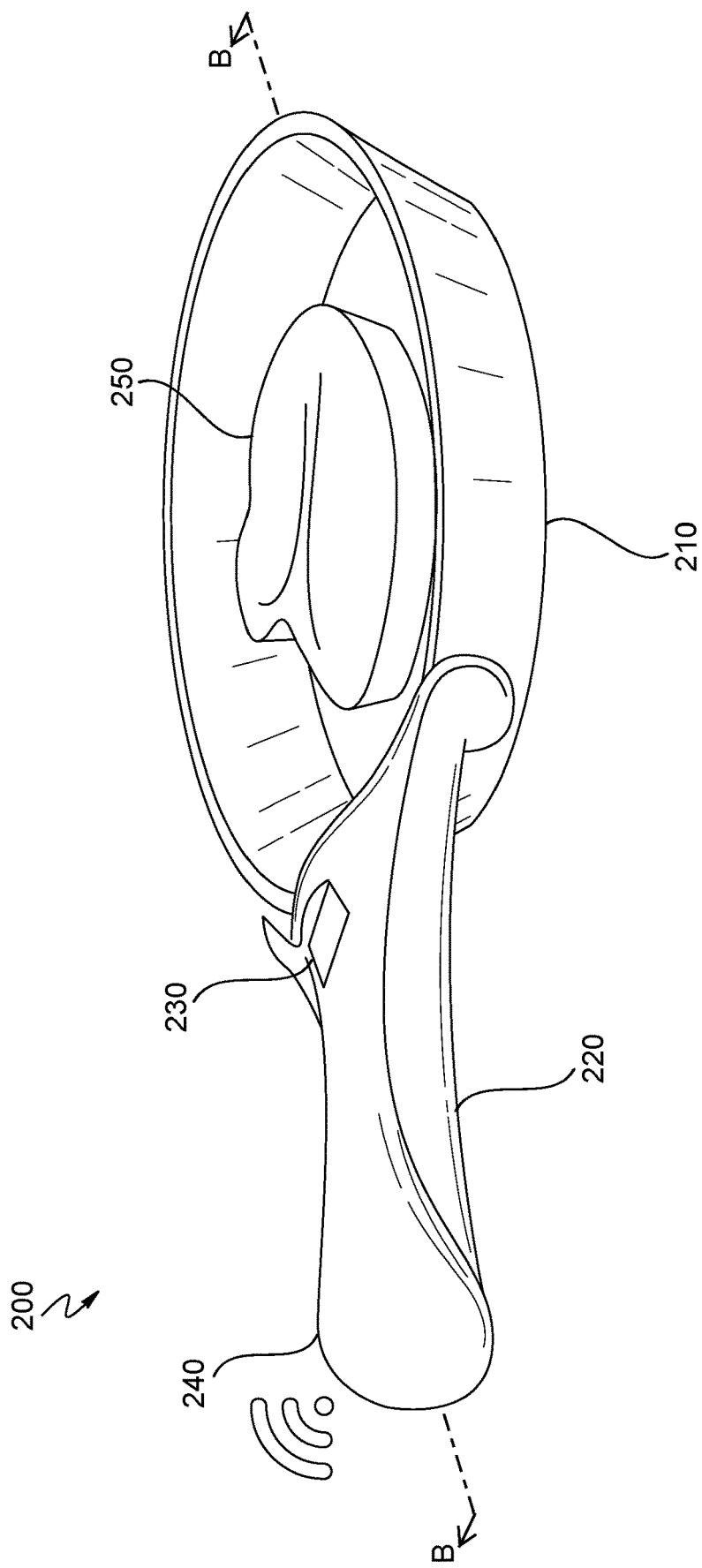
FIG. 6 is a perspective view of a cooking appliance with a removable temperature-sensing handle, according to an exemplary embodiment.

Referring now to FIG. 6, a view of a cooking appliance 200 with a removable temperature-sensing handle is shown. According to an exemplary embodiment, cooking appliance 200 includes a cooking vessel 210 and a removable temperature-sensing handle portion 220. Removable temperature-sensing handle portion 220 may be detachably coupled to cooking vessel 210 via any suitable means (e.g., fasteners, a "clip on-clip off" system). Cooking appliance 200 may be configured to convey heat to a foodstuff 250 during a cooking process, and cooking vessel 210 may be any type of vessel suitable to retain the foodstuff 250 during the cooking process. For example, in various embodiments, cooking vessel 210 may be a frying pan, a sauce pan, a stock pot, a skillet, a griddle, a sautépan, a grill pan, or a wok. In some embodiments, cooking vessel 210 includes a handle, and removable temperature-sensing handle portion 220 is configured to be secured over the handle of cooking vessel 210 (see FIGS. 8-9 below). In other embodiments, cooking vessel 210 does not include a handle, and handle portion 220 may be configured to interface with multiple cooking vessels 210. In this way, a user is able to detach the handle portion 220 and wash the cooking vessel 210 without potentially damaging the electronics of the handle portion 220.

Removable temperature-sensing handle portion 220 includes a display screen 230 and a wireless transmitting end 240. Display screen 230 may be any suitable type of display screen (e.g., LCD display, LED display, etc.) configured to display data related to the cooking process of foodstuff 250. For example, in various embodiments, display screen 230 may display properties including, but not limited to, a temperature of the foodstuff 250, a temperature of the cooking vessel 210, a time elapsed in the cooking of foodstuff 250, and an estimated time to completion of cooking foodstuff 250. Wireless transmitting end 240 may be configured to emit wireless signals generated by a wireless transmitter (e.g., wireless transmitting device 242, described below with reference to FIG. 7). In various embodiments, the wireless signals may be received by a wireless control device or cooking equipment. Wireless transmitting end 240 may transmit data collected by temperature-sensing handle portion 220 on a continuous basis or at discrete intervals (e.g., when a threshold is exceeded or a condition is satisfied).

FIG. 7 depicts a sectional view of cooking appliance 200, according to an exemplary embodiment. As shown, cooking appliance 200 is configured to convey heat to a foodstuff 250 during a cooking process and includes cooking vessel 210 and removable temperature-sensing handle portion 220. Removable temperature-sensing handle portion 220 is shown to include a memory device 222, a temperature sensing unit 232, and a wireless transmitter device 242. Memory device 222 may be configured to store data collected by temperature sensing unit 232. Wireless transmitter device 242 may be configured to transmit the data collected by temperature sensing unit 232 and stored by memory device 222 to a receiver, a receiver within cooking equipment, a mobile device, or cloud gateway via any suitable wireless means (e.g., Bluetooth protocols, RFID, near field communication). In some embodiments, memory device 222 and wireless transmitter device 242 are identical or substantially similar to memory device 17 and wireless transmitter device 19, described above with reference to FIG. 2.

Temperature sensing unit 232 is shown to include a first infrared sensor 234 and a second infrared sensor 236. In some embodiments, infrared sensors 234 and 236 include a lens configured to focus the infrared energy emitted by an object onto one or more photodetectors, which convert the energy to an electrical signal. In other embodiments, one or both of infrared sensors 234 and 236 do not include a lens. Because the emitted infrared energy of an object is proportional to its temperature, the electrical signal provides an accurate reading of the temperature of the object that the sensor is pointed towards. For example, target line 260 indicates that first infrared sensor 234 is configured to measure the temperature of foodstuff 250, while target line 262 indicates that second infrared sensor 236 is configured to simultaneously measure the temperature of cooking vessel 210. In various embodiments, temperature sensing unit 232 includes additional sensors configured to measure other properties (e.g., time elapsed in cooking, weight of foodstuff 250, viscosity of foodstuff 250) related to the cooking process. In still further embodiments, temperature sensing unit 232 may include additional infrared sensors or non-infrared temperature sensors. Temperature sensing unit 232 may further include a microprocessor configured to automatically configure the first infrared sensor 234 and the second infrared sensor 236 to adapt to the varying emissivity levels of different foodstuffs in order to accurately detect the temperature of the foodstuff 250 and the cooking vessel 210.

Figure 9:
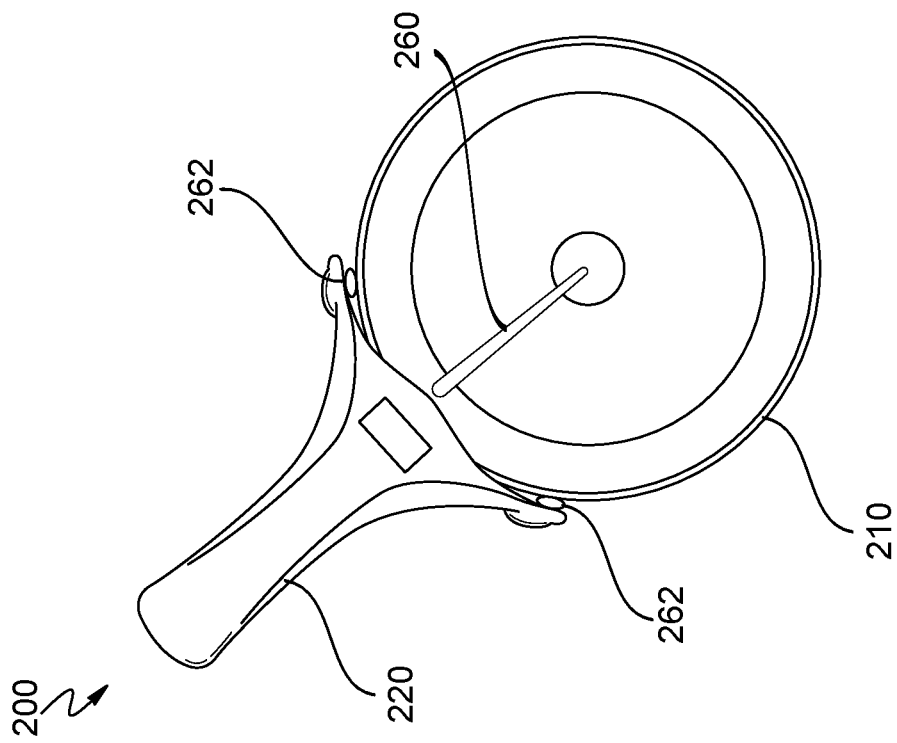
FIGS. 8-9 are perspective views of an assembly procedure for the cooking appliance of FIG. 6, according exemplary embodiments.
Figure 8:
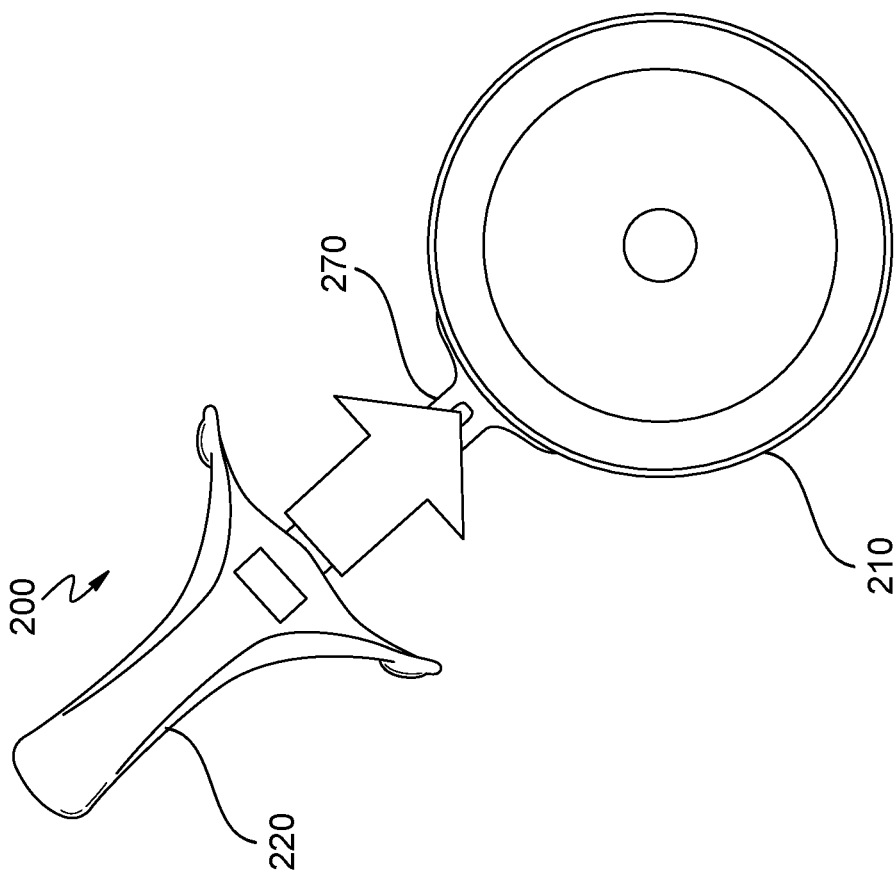

Referring now to FIGS. 8-9, views of an assembly procedure for cooking appliance 200 are shown, according to an exemplary embodiment. As described above, cooking vessel 210 may include a receptacle, an existing (fixed) handle and a removable temperature-sensing handle portion 220 that may be configured to fit over the existing (fixed) handle 270 and detachably couple to the cooking vessel 210 (e.g., the fixed handle, the receptacle, both, etc.). In some embodiments, the geometry of the existing handle 270 may affect the target locations of the infrared sensors of the temperature sensing unit 232. For example, as shown in FIG. 9, target line 260 of the first infrared sensor 234 may measure the temperature of the foodstuff contained within cooking vessel 210, while targets 262 of the second infrared sensor 236 may simultaneously measure the temperature of the cooking vessel 210 at the points at which cooking vessel 210 is coupled to temperature-sensing handle portion 220. If the temperature of the cooking vessel 210 or the foodstuff 250 is measured at multiple locations, the sensor readings may be combined to form a mean temperature reading via an appropriate statistical method, and/or adjusted to proximate the desired temperature location (e.g., adjusting the sensed temperature of the sidewall of the vessel 210 to reflect the actual temperature of the cooking surface). According to an alternative embodiment, the temperature of the existing handle 270 is detected (e.g., by thermocouple or otherwise, rather than infrared sensing the vessel 210), and the temperature of the cooking surface is calculated.

Figure 10:
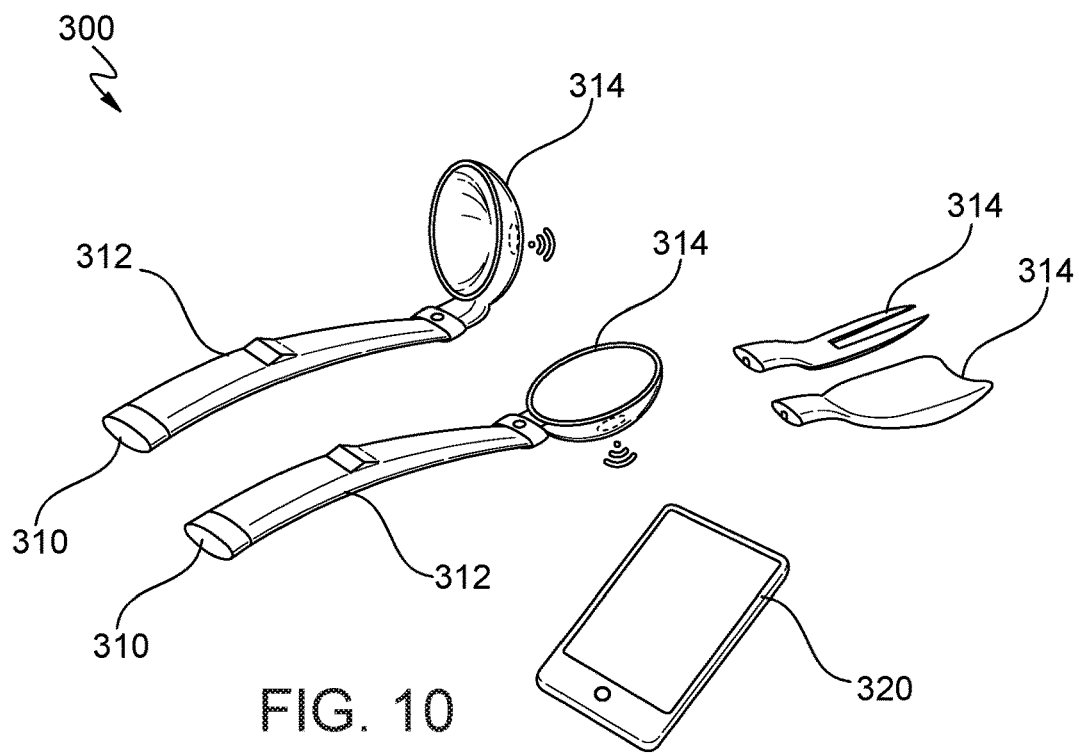
FIGS. 10-11 are perspective views of a wireless food-sensing utensil system, according to exemplary embodiments.
Figure 11:
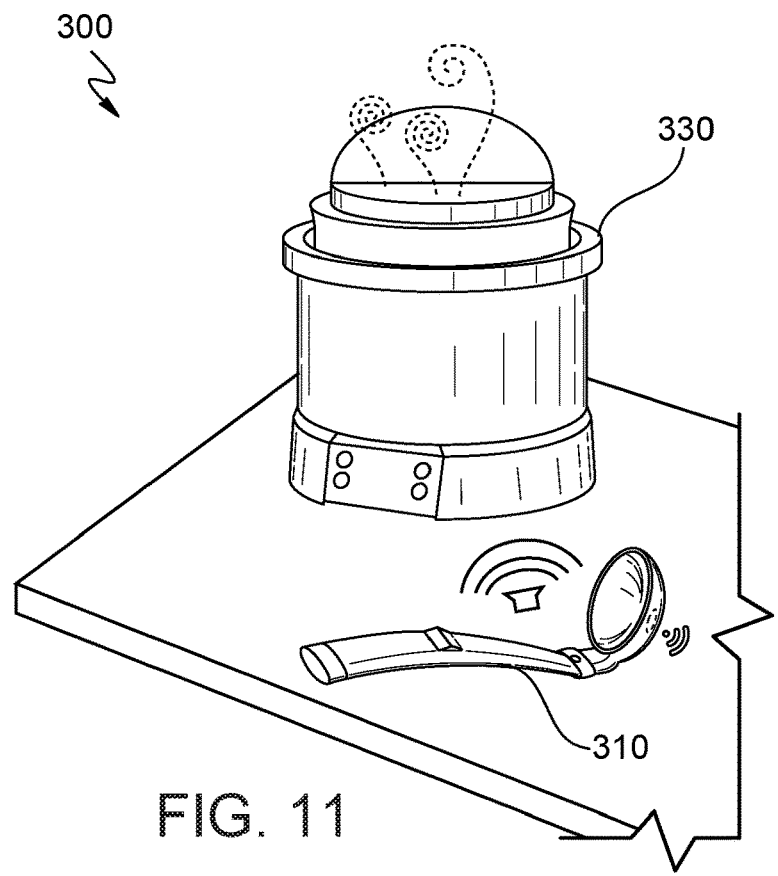

Turning now to FIGS. 10-11, another embodiment of the invention in a wireless food-sensing utensil system 300 is shown. Utensil system 300 is shown to include food utensil 310, wireless control device 320, and food equipment 330. Food utensil 310 may be utilized in any portion of a food preparation, rethermalization, storage, transportation, or service process and is shown to include a handle portion 312 and a sensing utensil portion 314. The handle portion 312 may be detachably coupled to the sensing utensil portion 314 such that the handle portion 312 and the sensing utensil portion 314 are interchangeable. In some embodiments, handle portion 312 includes a display screen configured to display data related to the food that is retained or otherwise in contact with sensing utensil portion 314.

In various embodiments, sensing utensil portion 314 may have the form of a spoon, a scoop, a fork, a ladle, a skewer, a spatula, a brush, a whisk, a server, or a turner. Sensing utensil portion 314 may include one or more various sensors, memory units, and wireless transmitter devices similar to those described above with reference to FIGS. 2 and 7. In some embodiments, sensing utensil portion 314 may be configured to detect properties related to the food in contact with utensil 310 other than temperature. For example, these properties may include cooking time, the presence of allergens with the food, and the weight, volume, level, or portions of food within food equipment 330. In other embodiments, food utensil 310 may include an audible or visual indicator configured to alert a user to the presence of a certain condition. For example, if sensing utensil portion 314 comes into contact with an allergen (e.g., peanuts), food utensil 310 may emit a beeping noise or an indicator light may flash red to indicate the presence of the allergen. As another example, utensil 310 may be configured to detect when utensil 310 has been removed from a certain vicinity of food equipment 330 (e.g., temperature drop, orientation, etc.) and may emit a beeping noise to prompt a user to replace the utensil 310 within the food equipment 330 (e.g., to ensure continuous monitoring). According to another embodiment, the handle portion 312 may include an additional sensor to detect the temperature of the vessel containing the food. For example, the handle portion 312 may have an infrared sensor that would be directed to the food vessel when the utensil is in its stored position. Alternatively, the handle portion 312 may have a contact sensor that touches the food vessel when the utensil is in its stored position (e.g., outer surface, built into a hook or notch that engages the food vessel, etc.).

Food utensil 310 may be configured to communicate with wireless control device 320 and/or food equipment 330 via wireless signals emitted from a wireless transmitter device embedded in sensing utensil portion 314. In various embodiments, wireless control device 320 is a mobile device (e.g., a smartphone, a tablet). In other embodiments, wireless control device 320 is a receiver unit specifically configured to control a particular type of food equipment 330, or a website configured to act as a gateway to a remote data storage facility (i.e., a cloud service). Food equipment 330 may include any piece of cooking equipment and may include, but is not limited to, a soup kettle, an induction cooker, an induction range, a steam table or tray, a chafing dish, or a food storage container. Based on the wireless messages emitted by food utensil 310, wireless control device 320 and/or food equipment 330 may modify a cooking process and/or alert a user to a condition of the foodstuff during the cooking process. For example, if temperature data detected by food utensil 310 indicates that a foodstuff in contact with utensil 310 has exceeded a certain threshold temperature, control device 320 may transmit a signal to food equipment 330 to reduce the cooking temperature of the food accordingly. As another example, if food utensil 310 indicates that a certain number of portions have been served from food equipment 330, wireless control device 320 may display a message to a user indicating the need to refill the food equipment 330.

Figure 12:
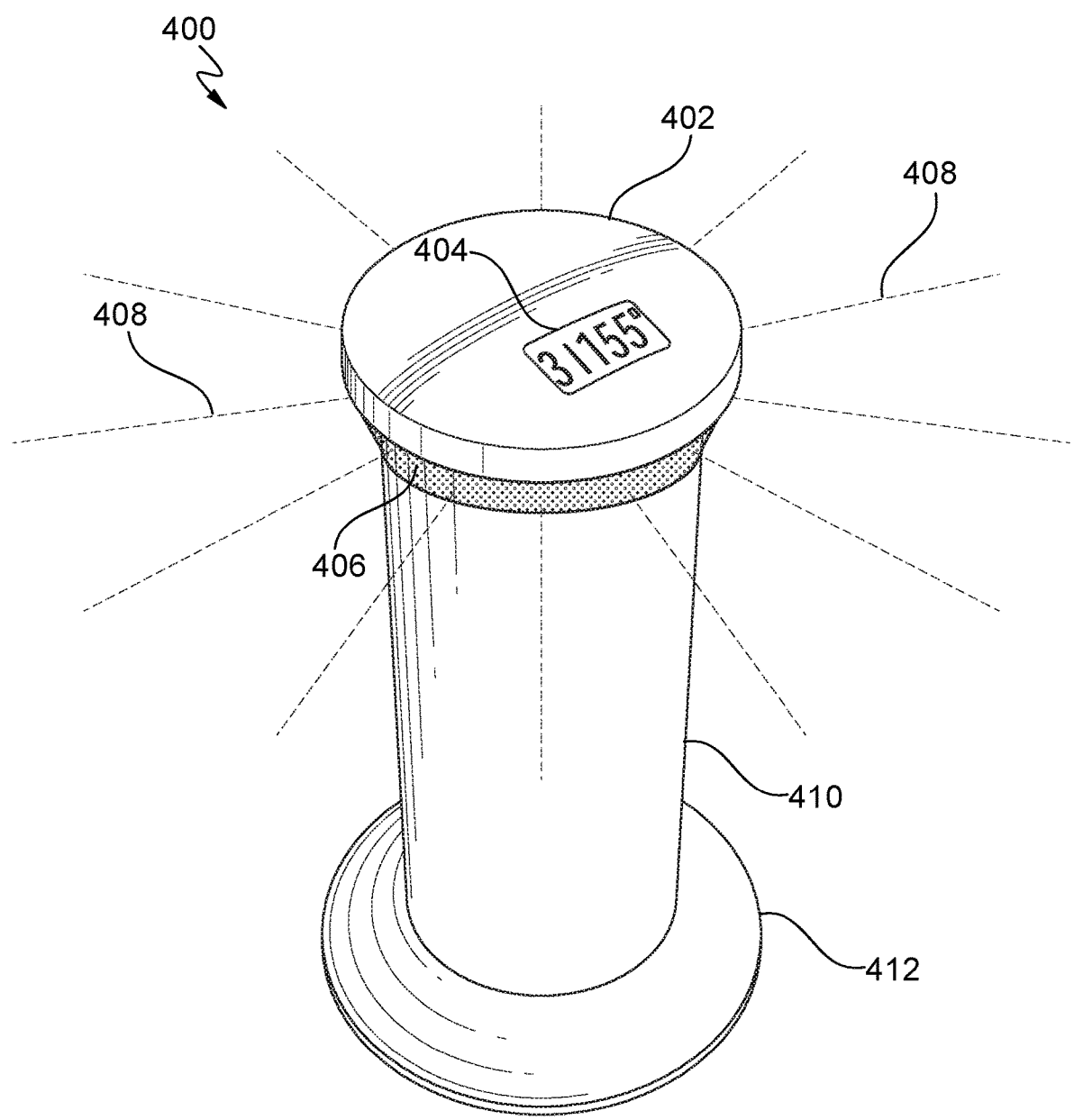
FIG. 12 is a perspective view of a contact and non-contact sensing beacon probe that can be used in the wireless probe food preparation system of FIG. 1, according to an exemplary embodiment.
Figure 13:
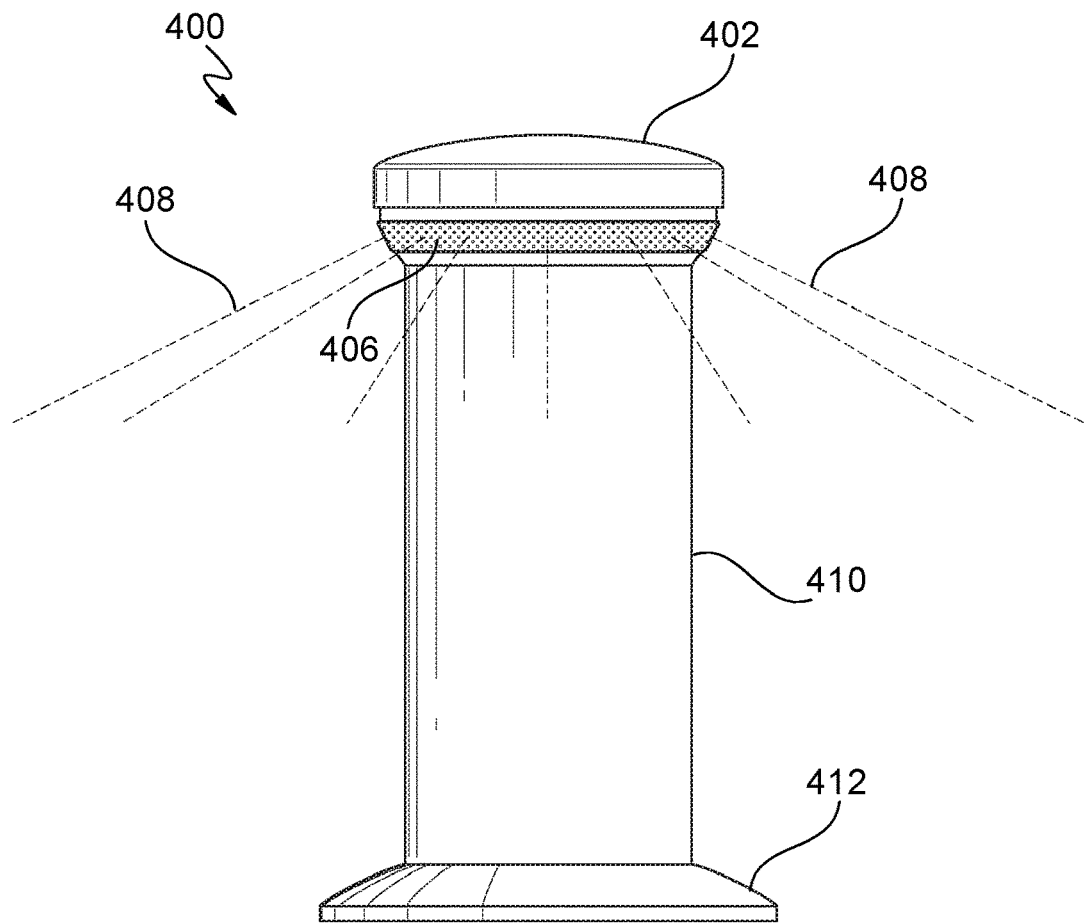
FIG. 13 is a front elevation view of the probe of FIG. 12, according to an exemplary embodiment.
Figure 14:
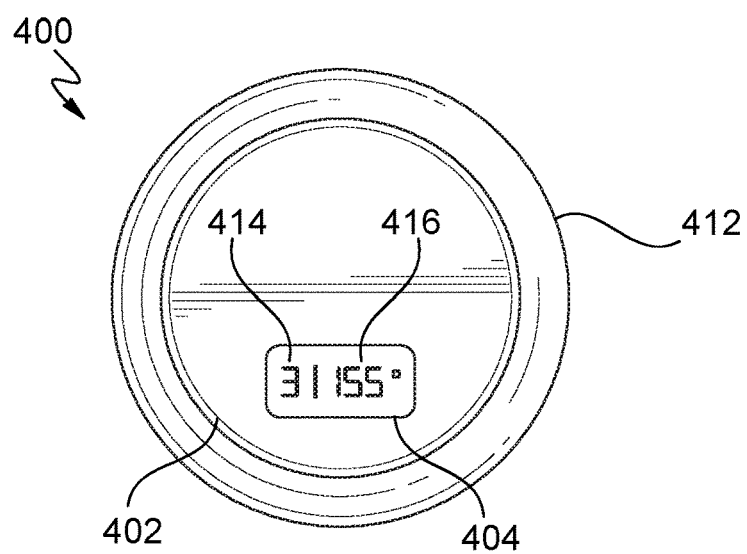
FIG. 14 is a top elevation view of the probe of FIG. 12, according to an exemplary embodiment.

Referring now to FIGS. 12-14, a contact and non-contact sensing beacon probe 400 is depicted, according to an exemplary embodiment. In some embodiments, the contact and non-contact sensing beacon probe 400 may be used in place of the wireless probe 10 in the food preparation system 100, as described above with reference to FIG. 1. Contact and non-contact sensing beacon probe 400 is shown to include a head portion 402 with a display component 404. In contrast to wireless probe 10, which may be configured to be fully submersible in a foodstuff, beacon probe 400 is intended to be partially submersible in a foodstuff. For example, the head portion 402 and the display component 404 is shown as not being submersible in a foodstuff. In this way, the display component 404 is visible to a user when the beacon probe 400 is operational and positioned within a food pan or other food container.

Display component 404 may be any suitable type of display (e.g., an LCD display, an LED display), and may be capable of depicting any desired information in any desired number of characters. For example, as specifically depicted in FIG. 14, the display component 404 displays a pairing identifier 414 and/or a temperature reading 416. Pairing identifier 414 is utilized to identify a specific beacon probe 400 within a system implementing multiple probes or sensing devices. For example, the contact and non-contact sensing beacon probe 400 depicted in FIGS. 12-14 is identified as probe "3" in a system employing three or more probes. As described in further detail below with reference to FIG. 20, the pairing identifier 414 may be displayed on a dashboard user interface that permits a supervisor of a food equipment system to monitor the temperatures of multiple foodstuffs from a mobile device (e.g., a smartphone, a tablet).

Temperature reading 416 may be an average temperature based on multiple temperature measurements detected by the probe 400. For example, as depicted in FIGS. 12-14, "155°" is the average temperature of the foodstuff in which the probe 400 is partially submerged. Temperature reading 416 may be displayed in units of degrees Fahrenheit or Celsius. In some embodiments, the average temperature may be calculated by weighting the detected temperature measurements according to the probe's position within food pan. For example, temperature measurements detected in a region close to a food pan edge may be weighted less heavily than temperature measurements detected in a region near the center of the food pan. In further embodiments, temperature reading 416 may display an equipment setpoint temperature in addition to or in place of the measured average temperature.

Figure 23:
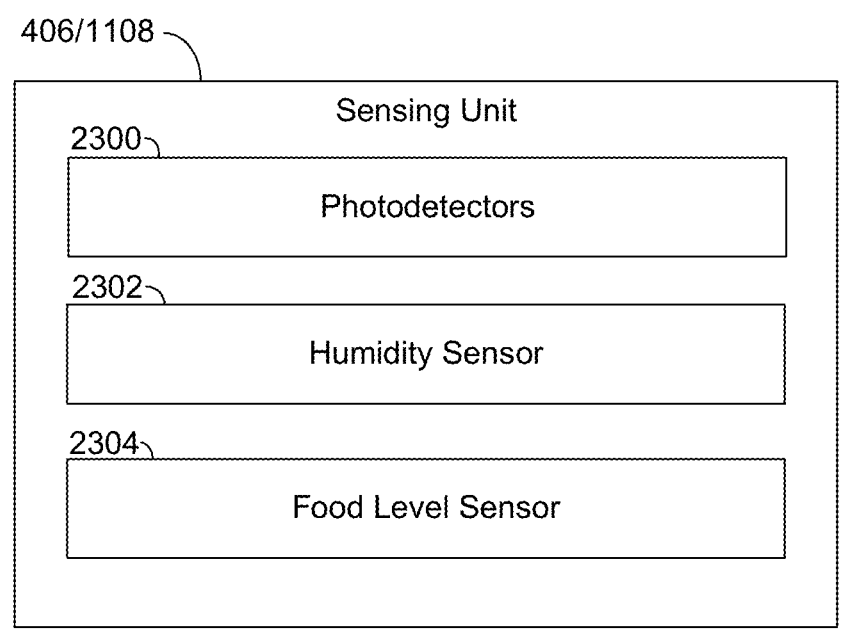
FIG. 23 is a block diagram of a sensing unit of the probe of FIG. 13 or FIG. 21, according to an exemplary embodiment.

Head portion 402 is situated above a circumferential sensing unit 406. The sensing unit 406 includes a lens having a substantially cylindrical or tubular shape that is configured to focus emitted infrared energy (represented as target lines 408) from an object (e.g., a foodstuff) onto one or more photodetectors, which convert the energy to an electrical signal indicative of the temperature of the object. For example, in some embodiments, multiple photodetectors are arranged in a radial pattern behind the lens of the sensing unit 406 in order to detect emitted infrared energy from any location surrounding the sensing unit 406. In various embodiments, for example as shown in FIG. 23, in addition to the photodetectors 2300 configured to detect temperature based on the emitted infrared energy, sensing unit 406 may include any desired type of sensor, including, but not limited to, humidity sensors 2302 and food level sensors 2304 (e.g., proximity sensor) configured to indicate when the foodstuff is in need of a refill. In still further embodiments, thermistor temperature sensors may be used in place of the infrared photodetector temperature sensors.

Contact and non-contact sensing beacon probe 400 is further shown to include a shaft portion 410 and an attachment device (shown as a suction cup 412). In some embodiments, the shaft portion 410 encapsulates various processing and transmission components required for the operation of the beacon probe 400. For example, the beacon probe 400 may include electronic processing and wireless transmission components packaged within the shaft portion 410. In various embodiments, the electronic processing and wireless transmission components may be identical or substantially similar to electronics unit 16, memory device 18, and wireless transmitter device 19, described above with reference to FIG. 2. Suction cup 412 may be a cup-shaped structure that uses negative pressure to adhere the beacon probe 400 to a food pan or other non-porous surface. The suction cup 412 permits the beacon probe 400 to detachably couple to the food pan such that the position of the probe 400 within the food pan may be adjusted. In other embodiments, suction cup 412 may be any component (e.g., a clamp device, one or more mechanical fasteners, magnets) coupled to the shaft portion 410 that permit the attachment of beacon probe 400 to a surface for monitoring purposes.

Probe 400 is shown to extend a height 418 from a bottom surface of the suction cup 412 to a top surface of the head portion 402. In various embodiments, the height 418 may range from 2.5 inches to 6 inches, inclusive. The height 418 of probe 400 may be chosen to ensure that the sensing unit 406 is optimally located relative to the object (i.e., foodstuff)

measured by the sensing unit 406. In still further embodiments, shaft portion 410 may include telescoping features to permit the height 418 to be extended or retracted to optimally locate the sensing unit 406 above the foodstuff. The head portion 402 is shown to have an outer diameter 420. In various embodiments, the outer diameter 420 is approximately (±10%) 1 inch. In other embodiments, the outer diameter 420 may be any dimension required to accommodate the components of the display component 404 and the sensing unit 406.

Figure 15:
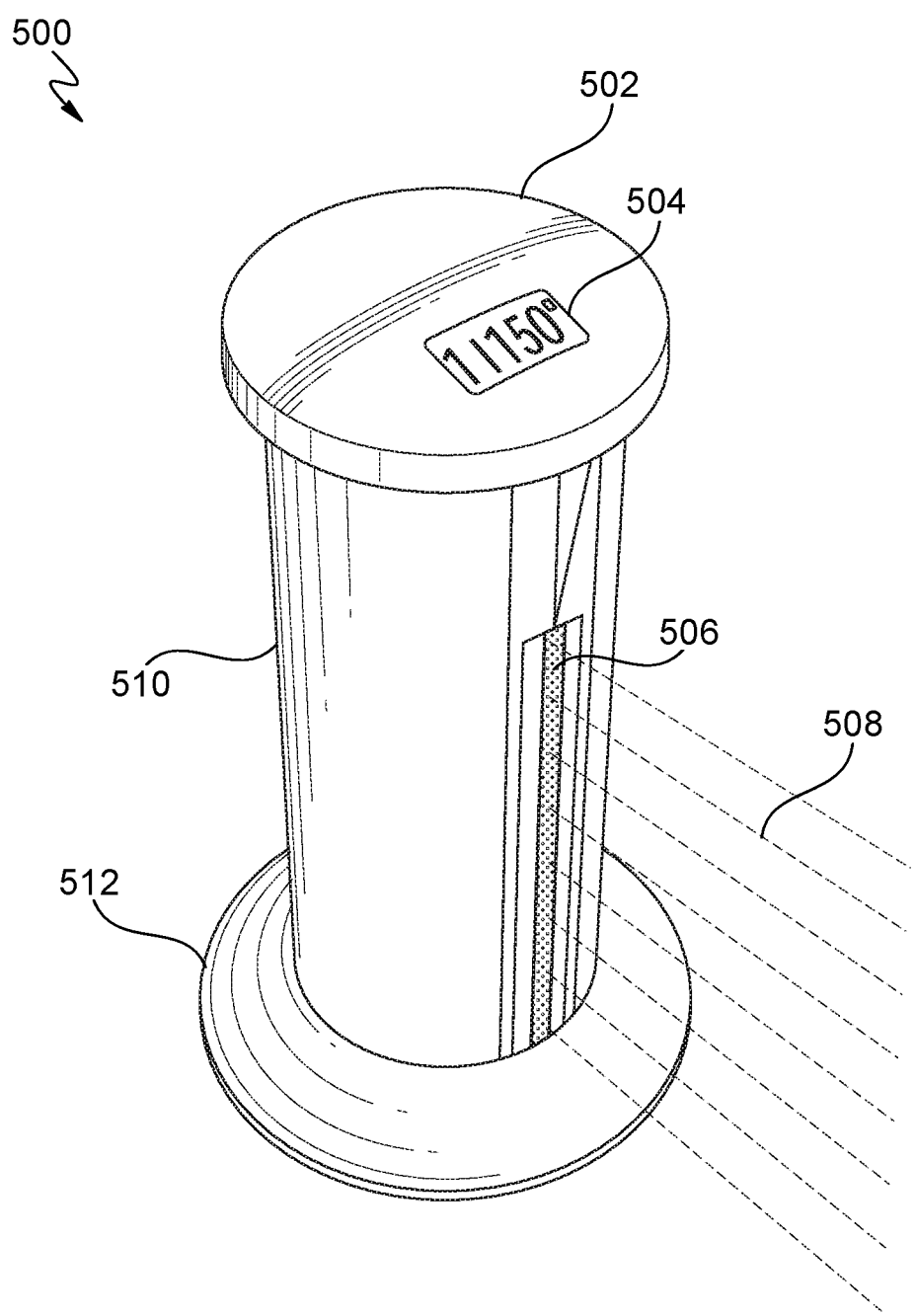
FIG. 15 is a perspective view of a contact and non-contact sensing beacon probe with an alternate sensor arrangement that can be used in the wireless probe food preparation system of FIG. 1, according to an exemplary embodiment.

Turning now to FIG. 15, a contact and non-contact sensing beacon probe 500 with an alternate sensing arrangement is depicted, according to some embodiments. Similar to the beacon probe 400, beacon probe 500 is shown to include a head portion 502, a display component 504, a shaft portion 510, and a suction cup 512, each of which may be identical or substantially similar to head portion 402, display component 404, shaft portion 410, and suction cup 412 as described above. However, in contrast to beacon probe 400, beacon probe 500 is shown to include a sensing unit 506 extending vertically along at least a portion of the shaft portion 510. Sensing unit 506 includes a rectangular-shaped vertical lens that is configured to focus emitted infrared energy (represented by target lines 508) from an object (e.g., a foodstuff) onto one or more photodetectors. For example, the sensing unit 506 of beacon probe 500 may include multiple photodetectors stacked within the shaft portion 510 to measure the temperature of a foodstuff at multiple depths.

Figure 16:
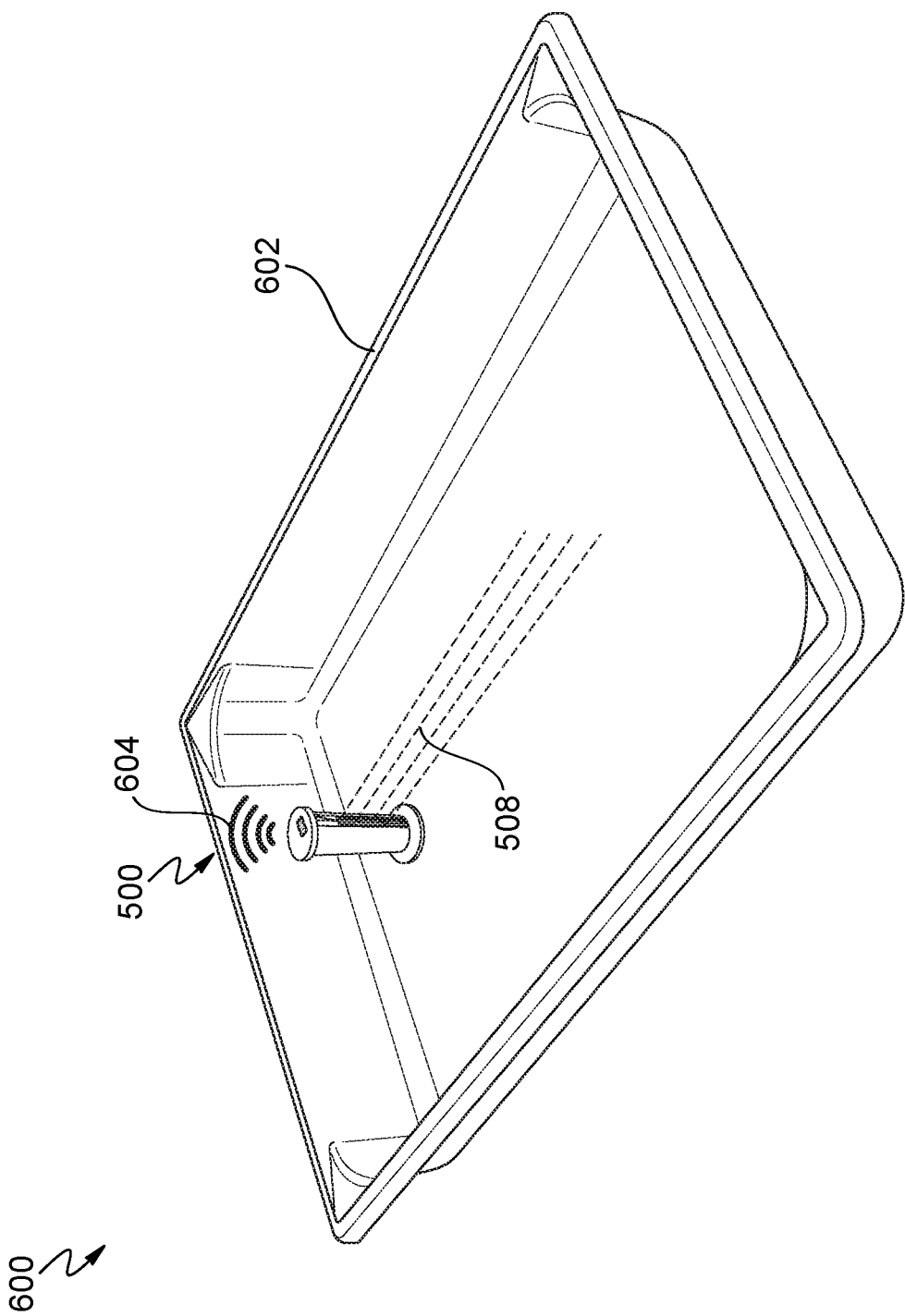
FIG. 16 is a perspective view of the probe of FIG. 15 located within a food pan, according to an exemplary embodiment.

Referring now to FIG. 16, a food equipment system 600 is depicted, according to some embodiments. As shown, food equipment system 600 includes a food pan 602 that may be used with a steam table or tray. In other embodiments, food pan 602 may be used with an induction range, a soup cooker, or another piece of equipment used to prepare or store food. Contact and non-contact sensing beacon probe 500 may be alternatively permanently or detachably coupled to the food pan 602 to detect temperature measurements of a foodstuff contained within the food pan 602 using the sensing unit 506. Once detected by the sensing unit 506, the temperature measurements, calculated average temperature, and other sensor readings may be wirelessly transmitted to a supervisory control device, as represented by wireless transmission lines 604. In response to receipt of the temperature measurements and other sensor readings, the supervisory control device may prompt a user to adjust an operating property of the equipment (e.g. cook temperature, humidity level) or perform some other action (e.g., refill the foodstuff in the food pan 602). In other embodiments, the supervisory control device may automatically adjust an operating property of the equipment based on temperature measurements and other sensor readings from one or more wireless probes 500.

Figure 17:
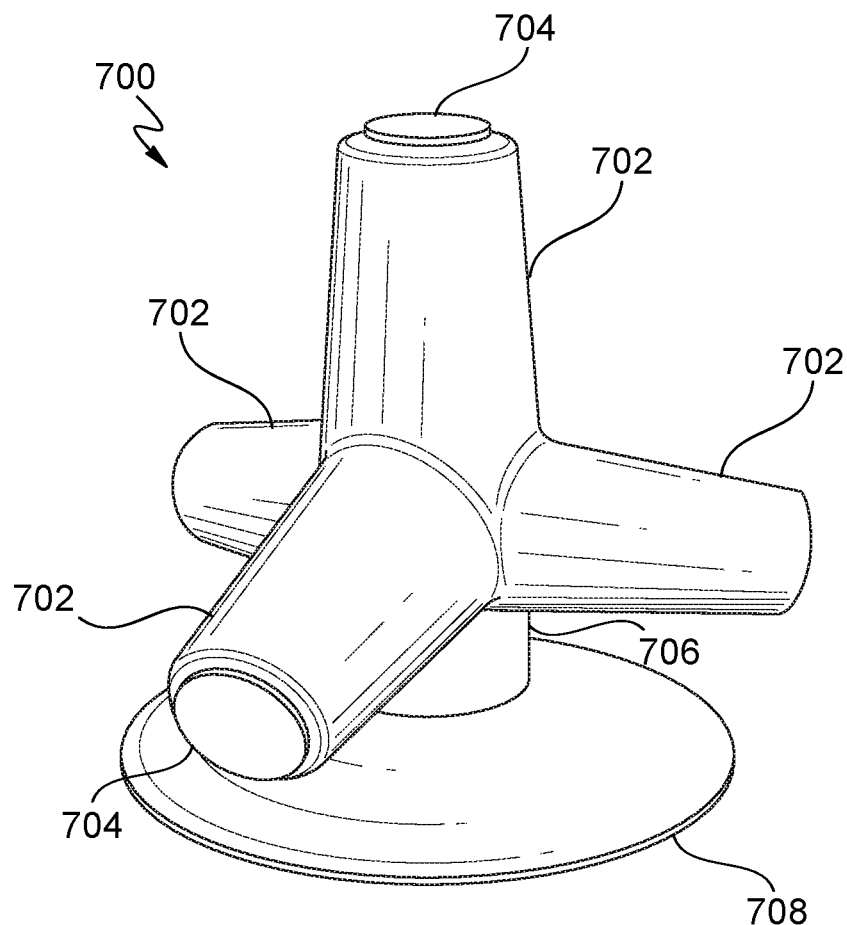
FIG. 17 is a perspective view of another wireless probe that can be used in the wireless probe food preparation system of FIG. 1, according to an exemplary embodiment.
Figure 18:
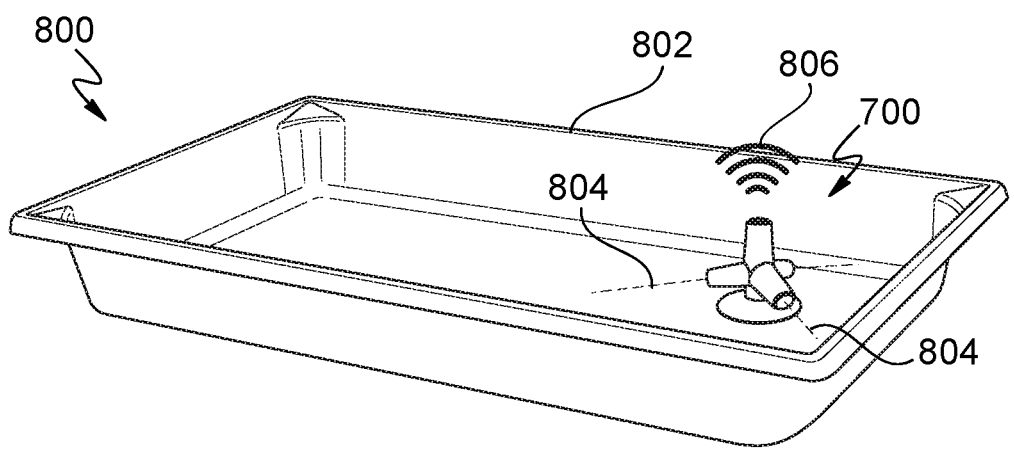
FIG. 18 is a perspective view of the wireless beacon probe of FIG. 17 located within a food pan, according to an exemplary embodiment.

FIGS. 17 and 18 depict another wireless probe 700, according to some embodiments. Specifically, FIG. 17 depicts a perspective view of the wireless probe 700, while FIG. 18 depicts a perspective view of the wireless probe 700 installed in a food equipment system 600. Similar to wireless probe 10, described above with FIGS. 1-5, wireless probe 700 may include multiple cylindrically-shaped arms 702 extending from a central point or hub. Each of the arms 702 may contain a sensing unit 704. As specifically depicted in FIG. 18, one or more of the sensing units 704 includes a lens that is configured to focus emitted infrared energy (represented as target lines 804) from an object (e.g., a foodstuff) onto one or more photodetectors, which convert the energy to an electrical signal indicative of the temperature of the object. In other embodiments, one or more of the sensing units 704 may be configured to detect or measure another property of an object (e.g., humidity, allergen presence). Each of the sensing units 704 may be communicably coupled to an electronics unit (not shown). In some embodiments, the electronics unit is identical or substantially similar to electronics unit 19, described above with reference to FIG. 2.

Wireless probe 700 is further shown to include a shaft portion 706 and a suction cup portion 708. The height of the shaft portion 706 and the suction cup 708 may be chosen so that each of the cylindrically-shaped arms 702 are submerged within a foodstuff when the wireless probe 700 is installed in a food pan. Suction cup 708 may be a cup-shaped structure that uses negative pressure to adhere the wireless beacon probe 700 to a food pan or other non-porous surface. In other embodiments, suction cup 708 may be any component (e.g., a clamp device, one or more mechanical fasteners, magnets) coupled to the shaft portion 706 that permits the attachment of wireless beacon probe 700 to a surface for monitoring purposes.

As shown in FIG. 18, the wireless probe 700 may be a component of a food equipment system 800 that includes a food pan 802 that may be used with a steam table or tray. In other embodiments, food pan 802 may be used with an induction range, a soup cooker, or another piece of equipment or appliance used to prepare or store food. Wireless probe 700 may be alternatively permanently or detachably coupled to the food pan 802 to detect temperature measurements of a foodstuff contained within the food pan 802. Once detected by the sensing units of the wireless probe 700, the temperature measurements, calculated average temperature, and other sensor readings may be wirelessly transmitted to a supervisory control device, as represented by wireless transmission lines 806. In response to receipt of the temperature measurements and other sensor readings, the supervisory control device may prompt a user to adjust an operating property of the equipment (e.g. cook temperature, humidity level) or perform some other action (e.g., refill the foodstuff in the food pan 802). In other embodiments, the supervisory control device may automatically adjust an operating property of the equipment based on temperature measurements and other sensor readings from one or more wireless probes 700.

Figure 19:
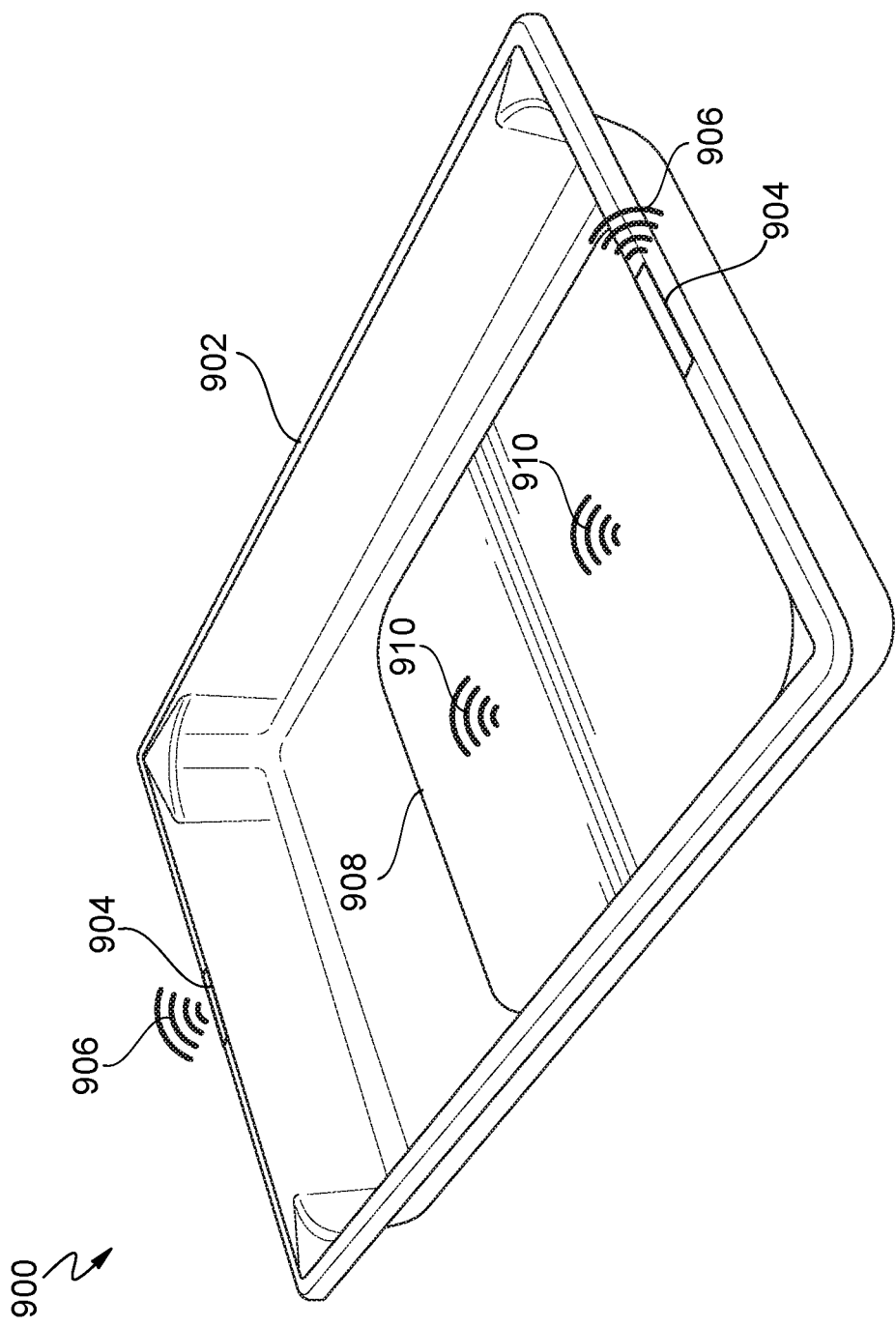
FIG. 19 is a perspective view of a wireless mat probe that can be implemented in a wireless probe food preparation system, according to an exemplary embodiment.

Referring now to FIG. 19, a perspective view of a smart pan and sensing mat assembly 900 is shown, according to some embodiments. Assembly 900 is shown to include a smart pan component 902 that is paired with (i.e., communicably coupled to) a sensing mat component 908. As depicted in FIG. 19, the smart pan 902 may be a pan used with a steam table or tray. In other embodiments, smart pan 902 may be any other style of pan (e.g., a soup kettle liner) or foodstuff container. In some embodiments, as depicted in FIG. 19, smart pan 902 may include one or more electronics units 904. The one or more electronics units 904 may be integral to or embedded within the smart pan 902 (i.e., inseparably coupled with the smart pan 902) and may include one or more sensor devices (e.g., contact sensors, infrared sensors, allergen sensors). For example, the sensor devices and the electronics units 904 may be situated between the layers of a smart pan 902 having a multi-ply construction. In various embodiments, the electronic processing and wireless transmission components of the electronics units 904 may be identical or substantially similar to electronics unit 16, memory device 18, and wireless transmitter device 19, described above with reference to FIG. 2.

The electronics units 904 may be configured to receive wireless communications 910 from the sensing mat component 908.

The sensing mat 908 may include embedded sensors configured to measure or detect any desired property of the foodstuff contained within the smart pan 902. These properties may include, but are not limited to, temperature, weight, and presence of allergens. In various embodiments, sensing mat 908 may include any number of embedded sensors required to optimally measure or detect one or more desired properties of the foodstuff. In addition, the embedded sensors may be distributed in any desired pattern. Sensing mat 908 may further include wireless transmission components to transmit wireless communications 910 containing sensor data to the electronics unit 904 of a smart pan 902, or to a supervisory control device. The dimensions of the sensing mat 908 (e.g., length, width) may be selected to fit the dimensions of the smart pan 902. Although sensing mat 908 is depicted as having a substantially rectangular shape, sensing mat 908 may have any desired geometry required to pair with the shape of the smart pan 902. For example, sensing mat 908 may have a circular shape if paired with a smart pan 902 having a circular base.

Figure 20:
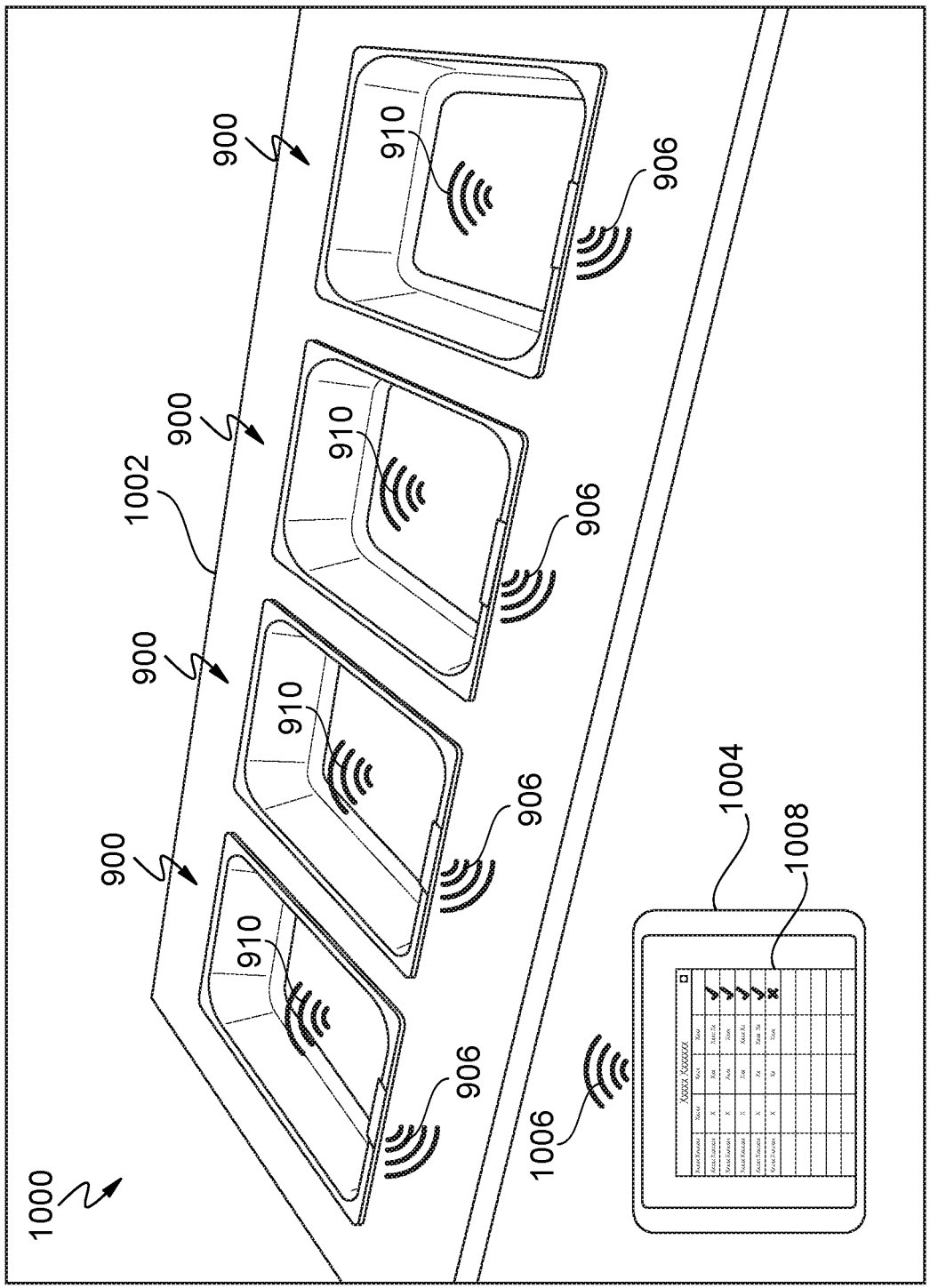
FIG. 20 is a perspective view of multiple wireless mat probes implemented in a wireless probe food preparation system, according to an exemplary embodiment.

FIG. 20 depicts a wireless probe food preparation system 1000, according to some embodiments. The wireless probe food preparation system 1000 includes a steam table or tray 1002 and multiple smart pan and sensing mat assemblies 900. Each of the smart pan and sensing mat assemblies 900 are communicably coupled to a supervisory control device 1004 through wireless transmissions 906 and 910. The transmissions 906 and 910 are received as wireless communications 1006 by the supervisory control device 1004.

The supervisory control device 1004 may be any device used to access a dashboard user interface 1008 that displays information related to a wireless probe food preparation system 1000. For example, the supervisory control device 1004 may be a mobile device (e.g., a smartphone, a tablet). In some embodiments, the dashboard user interface 1008 is stored on a cloud-based server and is accessible using any suitable computing device (e.g., a mobile device, a desktop computer). The dashboard user interface 1008 may include a grid-like display, with data regarding each of the wireless probes installed in the system 1000 displayed as separate rows. The data included in the dashboard user interface 1008 may include the device identifier (e.g., pairing identifier 414), the detected probe temperature (e.g., detected temperature 416), a probe communications status (e.g., connected or not connected), a probe fault status (e.g., nominal operation or fault detected), a food level (i.e., for refill purposes), and a tally of refills within a pre-determined time period. In further embodiments, the dashboard user interface 1008 includes user interface controls (e.g., buttons, links, toggle bars, sliders) to modify the operating characteristics of the wireless food preparation system 1000 or to perform some other function. For example, a user may access the dashboard user interface 1008 to modify a temperature of the food preparation system 1000 equipment (e.g., steam table 1002) or to transmit a message indicating the need for a refill of a foodstuff.

Figure 21:
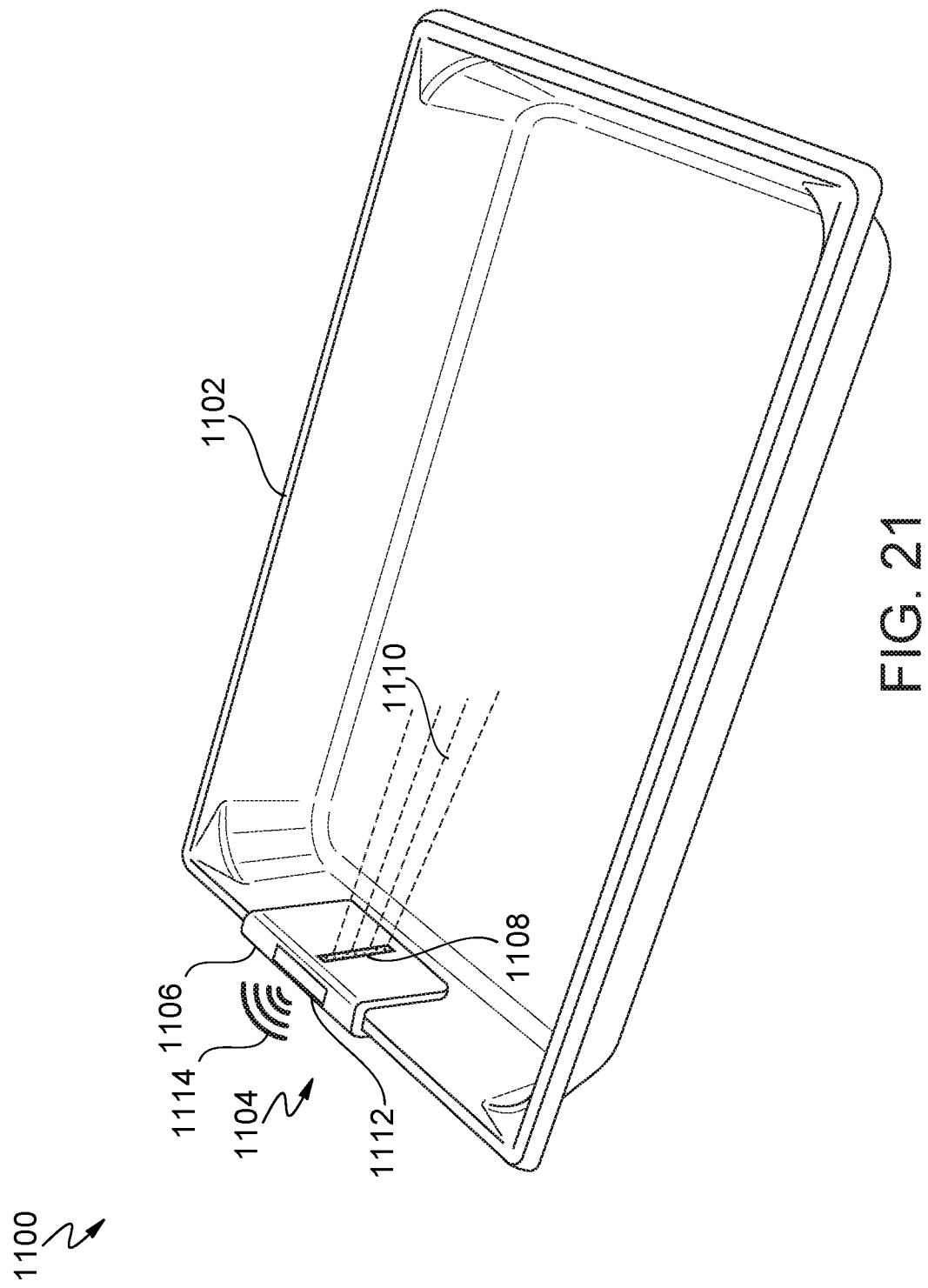
FIG. 21 is a perspective view of a pan edge-mounted probe that can be implemented in a wireless probe food preparation system, according to an exemplary embodiment.
Figure 22:
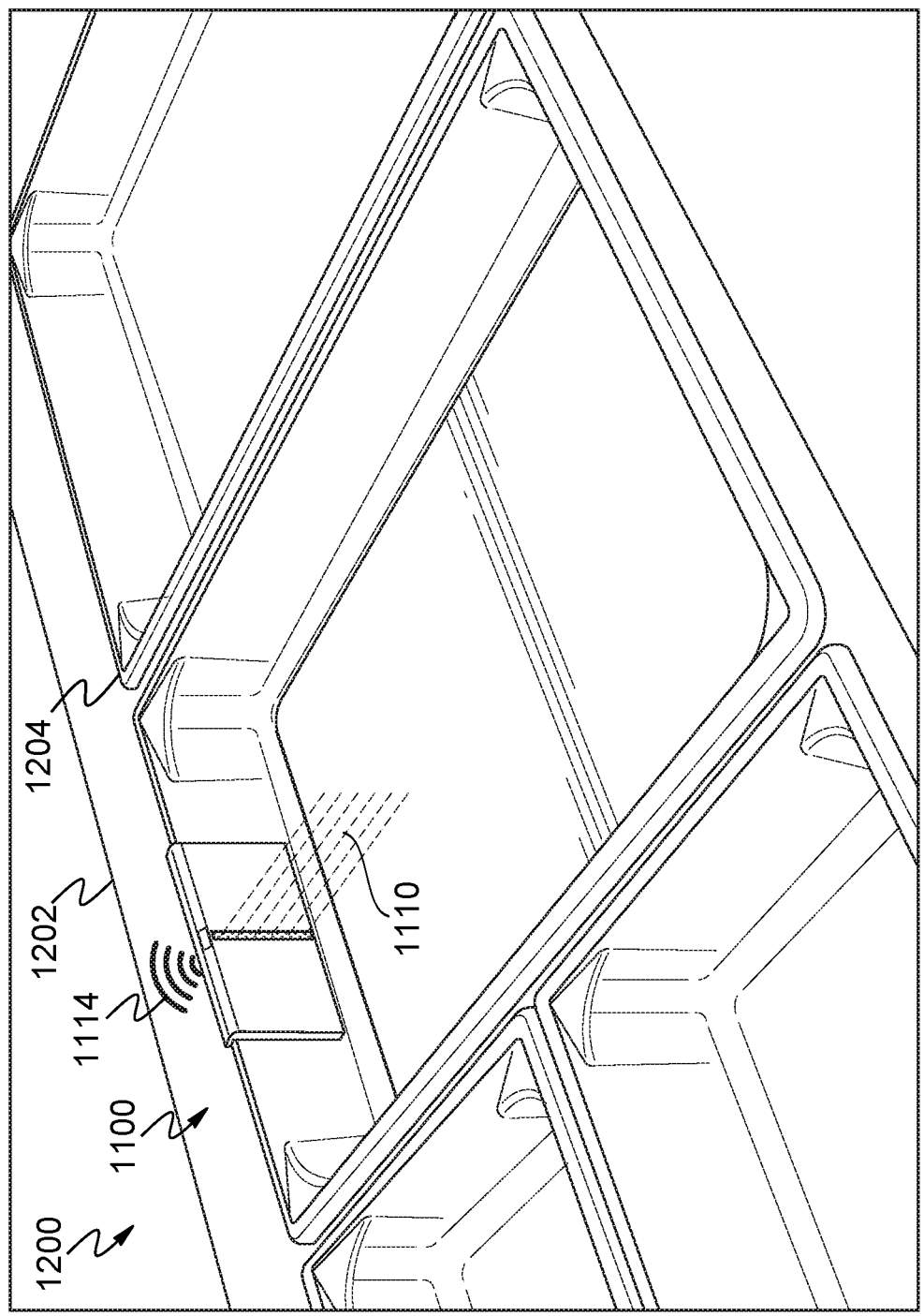
FIG. 22 is a perspective view of the pan edge-mounted probe of FIG. 21 implemented in a wireless probe food preparation system, according to an exemplary embodiment.

Turning now to FIGS. 21 and 22, views of a pan edge-mounted probe assembly 1100 are shown, according to some embodiments. Specifically, FIG. 21 depicts a perspective view of the probe assembly 1100, while FIG. 22 depicts a perspective view of a food equipment system 1200 with an installed probe assembly 1100. Probe assembly 1100 is shown to include a food pan 1102 and an edge-mounted device 1104. In contrast to the smart food pan 902, described above with reference to FIG. 19, food pan 1102 may be a "dumb" pan without embedded processing or transmission components.

Edge-mounted device 1104 is shown to include a probe body 1106 that is configured to couple to an edge of the food pan 1102. Although the probe body 1106 is shown to be coupled to the food pan 1102 along pan edge 1116 (i.e., a "short" edge of the pan), in other embodiments, probe body 1106 may be coupled to the food pan 1102 along pan edge 1118 (i.e., a "long" edge of the pan). In still further embodiments, pan edge-mounted probe assembly 1100 may include multiple edge-mounted devices 1104 mounted along both pan edges 1116 and 1118. As specifically depicted in FIG. 22, probe body 1106 may have any desired geometry that permits edge-mounted device 1104 to be securely attached to the food pan 1102 without interfering with the normal installation of the food pan 1102 in food equipment 1202 (e.g., a steam table). In other words, edge-mounted probe assembly 1100 may be installed in any location in which a "dumb" food pan 1204 may also be installed.

Returning to FIG. 21, edge-mounted device 1104 is shown to include a sensing unit 1108 that extends into a well portion 1120 of the food pan 1102. Sensing unit 1108 includes a rectangular-shaped vertically-oriented lens that focuses emitted infrared energy (represented as target lines 1110) from an object (e.g., a foodstuff) onto one or more photodetectors, which convert the energy to an electrical signal indicative of the temperature of the object. For example, the sensing unit 1108 of edge-mounted device 1104 may include multiple photodetectors stacked within the probe body 1106 to measure the temperature of a foodstuff at multiple depths. In some embodiments, for example as shown in FIG. 23, sensing unit 1108 may include the photodetectors 2300 and additionally include any desired type of sensor, including, but not limited to, humidity sensors 2302 and food level sensors 2304 configured to indicate when the foodstuff is in need of a refill. In still further embodiments, thermistor temperature sensors may be used in place of the infrared photodetector temperature sensors.

Edge-mounted device 1104 is further shown to include an electronics unit 1112. In various embodiments, the electronic processing and wireless transmission components of the electronics unit 1112 may be identical or substantially similar to electronics unit 16, memory device 18, and wireless transmitter device 19, described above with reference to FIG. 2. Electronics unit 1112 is further shown to include a display. Similar to display component 404, the display of electronics unit 1112 may show a device pairing identifier and a temperature reading. Once detected by the sensing unit 1108 of the edge mounted device 1104, the temperature measurements, calculated average temperature, and other sensor readings may be wirelessly transmitted to a supervisory control device (e.g., supervisory control device 1004), as represented by wireless transmission lines 1114. In response to receipt of the temperature measurements and other sensor readings, the supervisory control device may prompt a user to adjust an operating property of equipment (e.g., an operating temperature of steam table 1202) or perform some other action (e.g., refill the foodstuff in the food pan 1102).

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A probe used with food preparation, rethermalization, storage, transportation, and/or service, the probe comprising:
   a head portion comprising a display;
   a shaft portion coupled to the head portion and configured to be at least partially immersed in a foodstuff;
   a sensing unit configured to collect data including a temperature of the foodstuff, wherein the sensing unit comprises a food level sensor configured to provide an indication of a need to refill the foodstuff; and
   a wireless device configured to transmit data collected by the sensing unit to a supervisory control device.

2. The probe of claim 1, further comprising a suction cup coupled to the shaft portion and configured to detachably couple the probe to a food pan containing the foodstuff.

3. The probe of claim 1, wherein the display is configured to display a pairing identifier, wherein the pairing identifier is displayed on a dashboard user interface of the supervisory control device to identify the probe.

4. The probe of claim 1, wherein the display is configured to display the temperature of the foodstuff.

5. The probe of claim 1, wherein the sensing unit comprises a plurality of photodetectors configured to detect infrared energy emitted from the foodstuff.

6. The probe of claim 5, wherein the sensing unit is located between the head portion and the shaft portion and comprises a lens having a cylindrical shape.

7. The probe of claim 5, wherein the sensing unit is located in the shaft portion and comprises a lens having a rectangular shape.

8. The probe of claim 1, wherein the sensing unit comprises a thermistor.

9. The probe of claim 1, wherein a height of the probe ranges from 2.5 inches to 6 inches.

10. The probe of claim 1, wherein the shaft portion comprises telescoping features configured to permit adjustment of a height of the probe.

11. The probe of claim 1, wherein the supervisory control device is a smartphone or a tablet.

12. A system used with food preparation, rethermalization, storage, transportation, and/or service, the system comprising:
   a food pan configured to contain a foodstuff;
   a probe comprising:
      a probe body configured to couple to an edge of the food pan;
      a sensing unit configured to collect data including a temperature of the foodstuff, the sensing unit comprising a rectangular-shaped lens configured to focus infrared energy emitted from the foodstuff onto a plurality of photodetectors; and
      a wireless device configured to transmit data collected by the sensing unit; and
   a supervisory control device configured to receive transmissions from the wireless device and to display the data collected by the sensing unit on a dashboard user interface.

13. The system of claim 12, wherein the dashboard user interface is configured to display at least one of a pairing identifier, the temperature of the foodstuff, a probe communication status, and a probe fault status.

14. The system of claim 12, wherein the sensing unit further comprises a food level sensor configured to provide an indication of a need to refill the foodstuff.

15. The system of claim 14, wherein the supervisory control device is configured to transmit a message in response to the indication of the need to refill the foodstuff.

16. The system of claim 12, further comprising:
   a food preparation appliance, wherein the food pan is configured to be installed within the food preparation appliance; and
   wherein the supervisory control device is configured to modify an operating temperature of the food pan based on the data collected by the sensing unit.

17. A system used with food preparation, rethermalization, storage, transportation, and/or service, the system comprising:
   a food pan configured to contain a foodstuff;
   an electronics unit inseparably coupled with the food pan, the electronics unit comprising a sensing unit configured to collect data including the temperature of the foodstuff and a first wireless device configured to transmit data collected by the sensing unit; and
   a sensing mat situated in the food pan, the sensing mat comprising a plurality of embedded sensors and a second wireless device configured to transmit data from the plurality of embedded sensors to the electronics unit.

18. The system of claim 17, wherein the food pan is constructed from a plurality of layers and the sensing unit is located between at least two of the plurality of layers.

19. A probe used with food preparation, rethermalization, storage, transportation, and/or service, the probe comprising:
   a head portion comprising a display;
   a shaft portion coupled to the head portion and configured to be at least partially immersed in a foodstuff;
   a sensing unit located between the head portion and the shaft portion and configured to collect data including a temperature of the foodstuff, wherein the sensing unit comprises a lens having a cylindrical shape and a plurality of photodetectors configured to detect infrared energy emitted from the foodstuff; and
   a wireless device configured to transmit data collected by the sensing unit to a supervisory control device.

20. A probe used with food preparation, rethermalization, storage, transportation, and/or service, the probe comprising:
   a head portion comprising a display;
   a shaft portion coupled to the head portion and configured to be at least partially immersed in a foodstuff;
   a sensing unit located in the shaft portion and configured to collect data including a temperature of the foodstuff, wherein the sensing unit comprises a lens having a rectangular shape and a plurality of photodetectors configured to detect infrared energy emitted from the foodstuff; and
   a wireless device configured to transmit data collected by the sensing unit to a supervisory control device.

* * * * *